United States Patent
Wang

(10) Patent No.: US 12,503,101 B2
(45) Date of Patent: Dec. 23, 2025

(54) MOTION PLANNING WITH VARIABLE GRID RESOLUTION FOR GRAPH-SEARCH-BASED PLANNING

(71) Applicant: Aptiv Technologies AG, Schaffhausen (CH)

(72) Inventor: Qian Wang, Westfield, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 149 days.

(21) Appl. No.: 18/448,790

(22) Filed: Aug. 11, 2023

(65) Prior Publication Data

US 2025/0050866 A1 Feb. 13, 2025

(51) Int. Cl.
*B60W 30/06* (2006.01)
*B60W 30/10* (2006.01)
*B60W 60/00* (2020.01)

(52) U.S. Cl.
CPC .......... *B60W 30/06* (2013.01); *B60W 60/001* (2020.02); *B60W 2554/80* (2020.02)

(58) Field of Classification Search
CPC .. B60W 30/06; B60W 30/0956; B60W 30/10; B60W 30/18163; B60W 60/001; B60W 60/0011; B60W 60/0027; B60W 60/00272; B60W 60/00274; B60W 60/00276; B60W 2554/80
USPC .......................................... 701/25–28, 41–44
See application file for complete search history.

(56) References Cited

U.S. PATENT DOCUMENTS

| | | | | |
|---|---|---|---|---|
| 5,040,116 A | * | 8/1991 | Evans, Jr. ............. | G05D 1/0246 701/28 |
| 8,417,446 B2 | * | 4/2013 | Mays ................... | G09B 29/003 701/28 |
| 11,635,767 B2 | * | 4/2023 | Nisenzon ............. | G05D 1/0274 701/28 |

(Continued)

OTHER PUBLICATIONS

Fan, et al., "Baidu Apollo EM Motion Planner", Jul. 20, 2018, 15 pages.

(Continued)

*Primary Examiner* — Erick R Solis
(74) *Attorney, Agent, or Firm* — Harness, Dickey & Pierce, P.L.C.

(57) ABSTRACT

This document describes motion planning with variable grid resolution for graph-search-based planning. An example system includes a processor that obtains an initial pose, a goal pose, and an obstacle map for an environment. The processor uses a motion-planning algorithm to determine a path or trajectory using two or more grid resolutions for a graph-based search. The path includes a series of waypoints, including two-dimensional positional coordinates (and time coordinates if a trajectory), to navigate from the initial pose towards the goal pose. Operation of the host vehicle is then controlled to maneuver along the path using an assisted-driving or autonomous-driving system. In this way, motion planning is performed for the entire path but uses a coarser grid resolution for the portion nearer the goal pose. This allows motion planning for autonomous parking, especially in environments that include static and dynamic objects, to be handled in a more computationally-efficient manner.

18 Claims, 14 Drawing Sheets

(56) References Cited

U.S. PATENT DOCUMENTS

| | | | |
|---|---|---|---|
| 2011/0046784 A1* | 2/2011 | Anderson | G05D 1/0251 |
| | | | 701/28 |
| 2020/0257306 A1* | 8/2020 | Nisenzon | G06V 20/56 |
| 2022/0073101 A1* | 3/2022 | Wang | B62D 15/0285 |
| 2023/0044279 A1* | 2/2023 | Lu | G01S 17/86 |
| 2023/0168685 A1* | 6/2023 | Calleija | G08G 1/166 |
| | | | 701/28 |
| 2023/0213945 A1* | 7/2023 | Sajjan | G05D 1/0088 |
| | | | 701/28 |
| 2023/0331217 A1* | 10/2023 | Wang | B60W 30/18009 |
| 2025/0010854 A1* | 1/2025 | Cheng | G06V 10/764 |

OTHER PUBLICATIONS

Extended European Search Report regarding Application No. 23195699.6, dated Jan. 4, 2024.

Cowlagi R V et al: "Multiresolution path planning with wavelets: A local replanning approach", American Control Conference, 2008, IEEE, Piscataway, NJ, USA, Jun. 11, 2008 (Jun. 11, 2008), pp. 1220-1225, XP031296223, ISBN: 978-1-4244-2078-0.

Macenski Steve et al: "From the desks of ROS maintainers: A survey of modern & capable mobile robotics algorithms in the robot operating system 2", Robotics and Autonomous Systems, Elsevier BV, Amsterdam, NL, vol. 168, Jul. 27, 2023 (Jul. 27, 2023), XP087394383, ISSN: 0921-8890, DOI: 10.1016/J.ROBOT.2023.104493.

Tianyu Gu et al: "Tunable and stable real-time trajectory planning for urban autonomous driving", 2015 IEEE/RSJ International Conference on Intelligent Robots and Systems (IROS), IEEE, Sep. 28, 2015 (Sep. 28, 2015), pp. 250-256, XP032831650, DOI: 10.1109/IROS.2015.7353382.

* cited by examiner

MOTION PLANNING WITH VARIABLE GRID RESOLUTION FOR GRAPH-SEARCH-BASED PLANNING

BACKGROUND

Some vehicles provide autonomous or automated parking to assist drivers. Motion planning (e.g., a driving path to navigate a parking environment to park in a particular space or to respond to a summons request), however, is generally computationally expensive due to the large search space and complex environment (e.g., a combination of moving and stationary objects). For example, motion planning may involve using both a path planner and a speed planner to provide a collision-free trajectory in a complex parking environment with decision-making (e.g., yield, bias, overtaking) to handle static and dynamic objects. In addition, path searching often involves a relatively long distance that results in a large computational cost to perform motion planning in such scenarios.

SUMMARY

This document describes techniques and systems for motion planning with variable grid resolution for graph-search-based planning. An example system includes a processor that obtains an initial pose (e.g., a source node), a goal pose (e.g., a goal node), and an obstacle map for a parking environment or similar roadway. The processor may also obtain a reference path. The processor then uses a motion-planning algorithm and the obstacle map (and reference path, if available) to determine a path (or trajectory) by searching using two or more grid resolutions for a graph-based search. The path includes a series of waypoints to navigate from the initial pose toward the goal pose. Each waypoint includes two-dimensional (2D) position information or coordinates and optional time information or coordinates (if a 3D trajectory). The processor controls the operation of the host vehicle to maneuver along the path or trajectory toward the goal pose using an assisted-driving or autonomous-driving system. In this way, the example system performs the path or trajectory search for the entire path distance but uses a coarser grid resolution for the portion of the graph search nearer the goal pose. This allows motion planning for autonomous parking, especially in parking environments that include static and dynamic objects, to be handled in a more computationally-efficient manner.

This document also describes methods performed by the above-summarized system and other configurations set forth herein and computer-executable instructions and means for performing these methods.

This Summary introduces simplified concepts related to motion planning with variable grid resolution for graph-search-based planning in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of techniques and systems for motion planning with variable grid resolution for graph-search-based planning are described in this document with reference to the following figures. The same numbers are often used throughout the drawings to reference similar features and components:

FIGS. 4-1 through 4-4 illustrate example artificial potential fields for motion planning;

FIGS. 8-1 through 8-4 illustrate an example 3D search space for motion planning;

FIGS. 9-1 through 9-6 illustrate an example path of a vehicle with a parking system using a dynamic and variable grid resolution for graph-search-based planning.

DETAILED DESCRIPTION

Overview

Figure 1:
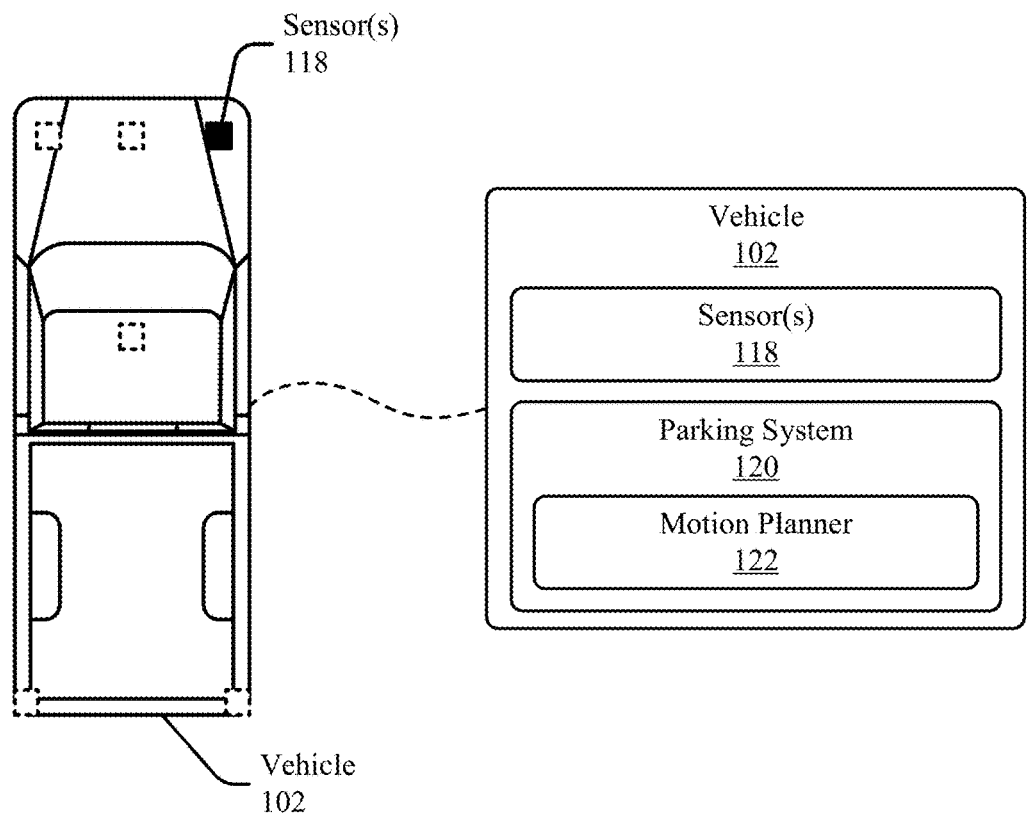
FIG. 1 illustrates an example environment in which a parking system performs motion planning using a variable grid resolution for graph-search-based planning in accordance with the techniques of this disclosure.
Figure 1:
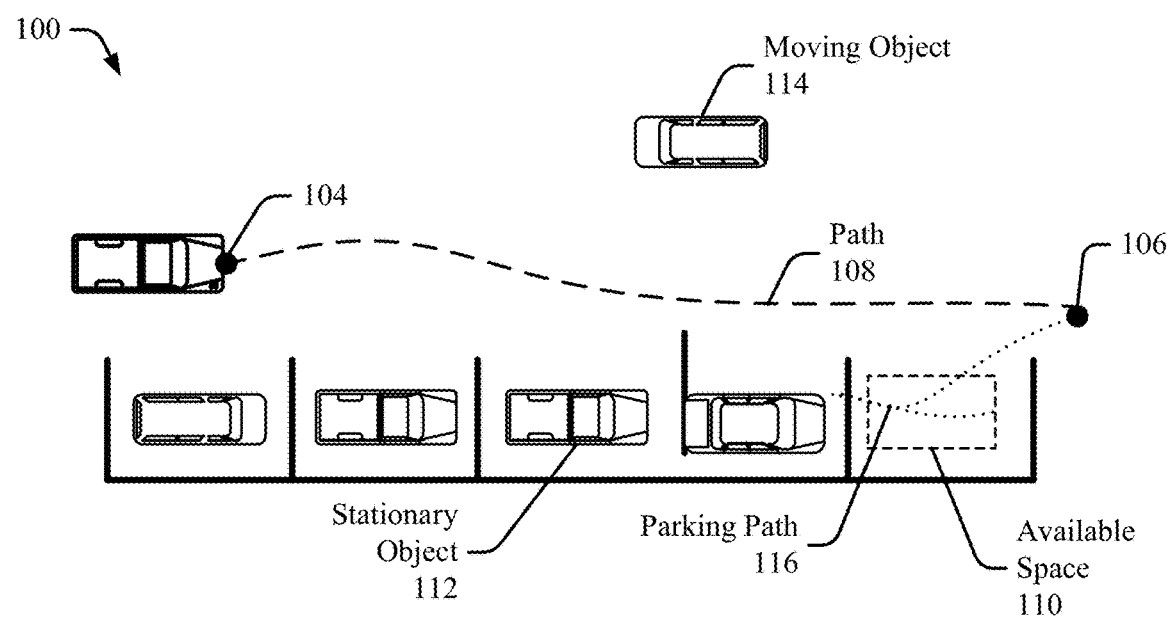

Some vehicles provide autonomous or automated parking and summoning functionality. Many autonomous or automated parking systems use parking path algorithms to generate a parking path (or summons path) and/or speed profile to navigate the host vehicle to a selected parking space (or respond to a summons request). Motion planning for autonomous parking and summoning, however, is a complex and computationally-expensive task due to the relatively large search space around the selected parking space, non-holonomic constraints on vehicle motion (e.g., vehicles cannot directly move sideways, but must move forwards or backward to effect a sideways movement), and avoidance of nearby obstacles (e.g., parked vehicles, moving vehicles, pedestrians, and other objects).

Some parking systems use an iterative combination of a path planner and a speed planner to generate a path. In the path planner and at each search, these parking systems may predict an object's position and perform biasing (e.g., provide distance offsets) against it to generate a 2D path. The distance to be traveled is often relatively long, resulting in a computationally-expensive search. These parking systems may use a speed planner to generate a speed profile based on cost functions associated with avoiding nearby objects and reaching the desired destination (e.g., a parking spot). Because the host vehicle's speed profile may be changed by the speed planner based on a new or updated 2D path, the predicted moving-object's position may also change, and the motion planner must determine another speed profile. The influence and impact of the path planner and the speed planner on each other in such parking systems results in an iterative path-speed algorithm, exacerbated by the relatively long distance for many parking or summoning operations.

In contrast, this document describes techniques and systems for motion planning using a variable grid resolution for graph-search-based planning to reduce the computational cost of searching the entire 2D or 3D search space. For example, a parking system obtains an initial pose (e.g., a source node), a goal pose (e.g., a goal node), and an obstacle map for the parking environment. The parking system may also receive a reference path. The parking system uses a motion-planning algorithm, the obstacle map, and the reference path (if provided) to determine a path or trajectory by searching using two or more grid resolutions for a graph-based search. The path or trajectory includes a series of 2D or 3D waypoints, respectively, including 2D positional coordinates and optional time coordinates, to navigate the host vehicle from the initial pose toward the goal pose. The host vehicle is then controlled to maneuver along the path or trajectory toward the goal pose. In this way, the described techniques and systems perform the path or trajectory search in a finer grid resolution near the current position of the host vehicle and a coarser grid resolution for portions of the environment further away to reduce the computational cost of the motion planning. As the host vehicle navigates along the path or trajectory, the path or trajectory is updated with the finer grid resolution near the updated position of the host vehicle, thus providing a dynamic grid resolution that moves with the host vehicle. This allows motion planning for autonomous parking operations, especially in parking environments that include static and dynamic objects, to be handled in a more computationally-efficient manner.

This is just one example of the described techniques and systems for motion planning using a variable grid resolution for graph-search-based planning. This document describes other examples and implementations.

Operating Environment

FIG. 1 illustrates an example environment 100 in which a parking system 120 of a vehicle 102 (e.g., a host vehicle, an ego vehicle) performs motion planning using a variable grid resolution for graph-search-based planning in accordance with the techniques of this disclosure. In the depicted environment 100, the vehicle 102 is in a parking lot or other environment with multiple parking spaces. In other implementations, the environment 100 may be a roadway with parking spaces off to the side of the roadway. The parking spaces are illustrated in FIG. 1 as parallel to the travel path of the vehicle 102. The parking spaces may also be at an angle or perpendicular to the travel path of the vehicle 102. The environment 100 includes stationary objects 112 (e.g., other vehicles parked in some of the parking spaces, pillars, curbs, and barriers) and moving objects 114 (e.g., pedestrians and other vehicles navigating the environment 100). Environment 100 may also include an available space 110 that is unoccupied.

Although illustrated as a passenger truck, the vehicle 102 can represent other types of motorized vehicles (e.g., a car, an automobile, a motorcycle, a bus, a tractor, a semi-trailer truck), watercraft (e.g., a boat), or aircraft (e.g., an airplane). The vehicle 102 includes one or more sensors 118 and the parking system 120. In the depicted environment 100, the sensors 118 are mounted to, or integrated within, front, central, and rear portions of the vehicle 102. As described in greater detail below, the sensors 118 may include camera systems, radar systems, lidar systems, ultrasonic systems, and positioning systems. The sensors 118 can provide sensor data regarding the stationary objects 112 and moving objects 114 to the parking system 120 (e.g., as an obstacle map).

In addition, the parking system 120 or another component of the vehicle 102 can use the sensors 118 to obtain an initial pose 104 and/or a goal pose 106 of the vehicle 102 (e.g., to park in the available space 110). The sensors 118 can also be used to generate an obstacle map for the environment 100 that includes the stationary objects 112 and the moving objects 114.

In the depicted implementation, the sensors 118 are mounted on the front of the vehicle 102 and may provide sensor data for building the obstacle map. The sensors 118 can detect nearby objects or parking-space characteristics from any exterior surface of the vehicle 102. For example, vehicle manufacturers can integrate a radar system, a lidar system, a camera, or an ultrasonic sensor into a bumper, side mirror, headlights, or any other interior or exterior location where objects (e.g., stationary objects 112, moving objects 114) require detection. In some cases, vehicle 102 includes multiple sensors and/or sensor types, such as a radar system and a camera, which provide a larger instrument field of view or improved detection of nearby objects. In general, vehicle manufacturers can design the locations of the sensors 118 to provide a particular field of view that encompasses a region of interest. Example fields of view include a 180-degree field of view, one or more 90-degree fields of view, and so forth, which can overlap or be combined into a field of view of a particular size.

The parking system 120 may provide assisted or autonomous driving to a driver of the vehicle 102. For example, the parking system 120 can identify a selected parking space (e.g., the available space 110) and generate a path 108 (or trajectory) to navigate from the initial pose 104 toward the goal pose 106, which is near the selected parking space. In some implementations, the parking system 120 can then provide a parking path 116 (or trajectory) to an assisted-driving or autonomous-driving system to park the vehicle 102 in the available space 110.

The parking system 120 can include a motion planner 122. The parking system 120 and the motion planner 122 can be implemented using hardware, software, firmware, or a combination thereof. The parking system 120 may also include a parking space selector that can identify the available space 110 and select it or another parking space for the vehicle 102. In other implementations, the driver can provide input to the parking system 120 to select a desired parking space.

The motion planner 122 may determine the path 108 (or trajectory), which includes a positional path plan and/or a speed plan, for navigating the vehicle 102 from the initial pose 104 to the goal pose 106 (e.g., a position near the available space 110) while avoiding collisions with stationary objects 112 and moving objects 114. The path 108 may also include the path plan and/or speed plan for navigating the environment 100 to find the available space 110 or exit the environment 100. The path 108 includes a series of waypoints, with each waypoint indicating 2D positional information or coordinates and (optionally) time information and coordinates (if a 3D trajectory), in between the initial pose 104 and the goal pose 106.

The motion planner 122 uses a space or space-time artificial potential field to plan paths or trajectories in 2D or 3D search space while using a dynamic and variable grid resolution to minimize the computational cost associated with the motion planning. For example, the motion planner 122 may use two or more different grid resolutions for the graph-based search, with finer grid resolution being used for the search space nearest the vehicle 102 and coarser grid resolution used for the remainder of the planned path or trajectory. In each iteration or cycle of the motion planning, the motion planner 122 uses the finer grid resolution for the portion of the environment 100 nearest the current position of the vehicle 102 to update or recalculate the remaining portion of the path 108. As a result, the finer grid resolution dynamically moves with the vehicle 102 as it progresses along the (updated) path 108 (or trajectory). The motion planner 122 may use a variant of the A star (A*) or hybrid A* algorithms to determine the path 108. In other implementations, the motion planner 122 may use Dijkstra, Anytime A*, D*, D* Lite, or similar algorithms. In this way, the motion planner 122 can determine and update the path 108 (or trajectory) in a computationally-efficient manner with sufficient resolution for autonomous operations, while still providing a complete planned path.

Vehicle Configuration

Figure 2:
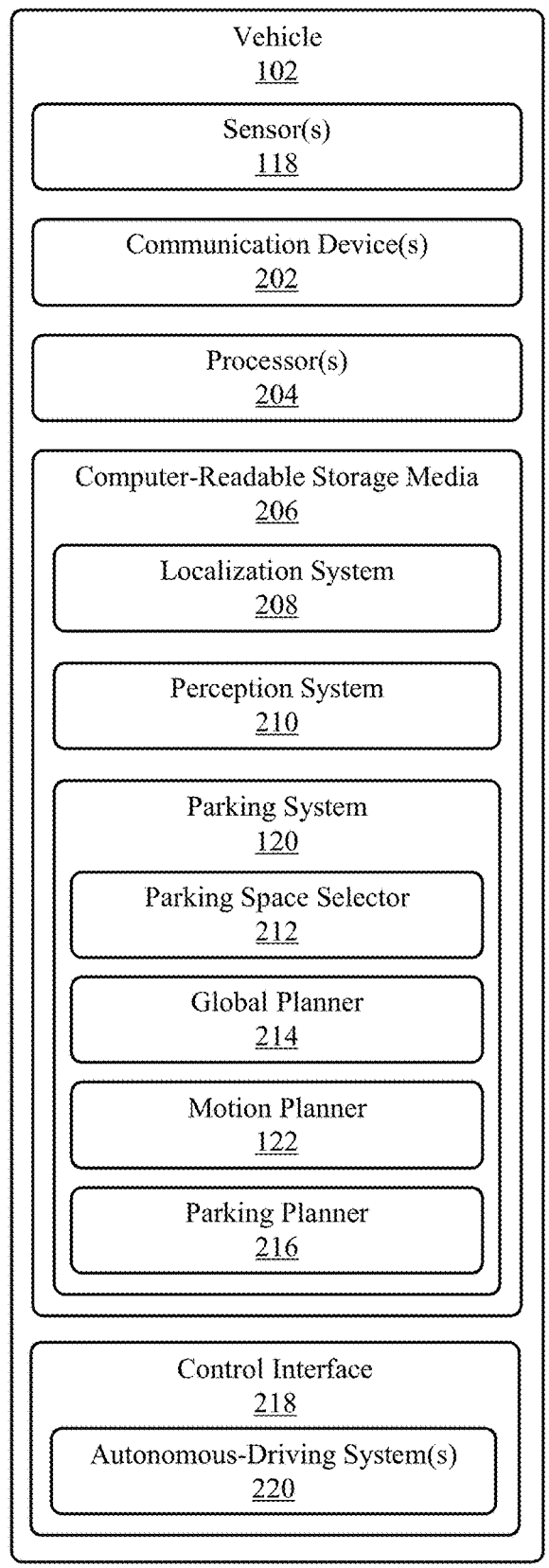
FIG. 2 illustrates an example configuration of a vehicle with a parking system that performs motion planning using a variable grid resolution for graph-search-based planning.

FIG. 2 illustrates an example configuration of the vehicle 102 with the parking system 120 that performs motion planning using a variable grid resolution for graph-search-based planning. As described in FIG. 1, the vehicle 102 includes the sensors 118 and the parking system 120, which may include a parking space selector 212, a global planner 214, the motion planner 122, and a parking planner 216. In addition, the vehicle 102 may include one or more communication devices 202, one or more processors 204, computer-readable storage media (CRM) 206, and a control interface 218 to one or more vehicle-based systems, including one or more autonomous-driving systems 220.

The communication devices 202 can include a sensor interface and a vehicle-based system interface. The sensor interface and the vehicle-based system interface can transmit data (e.g., radar data, range computations) over a communication bus of the vehicle 102, for example, when the individual components of the sensors 118 and/or the parking system 120 are integrated within the vehicle 102.

The processors 204 (e.g., an energy processing unit or electronic control unit) may be a microprocessor or a system-on-chip. The processors 204 execute instructions stored in the CRM 206, on one or more disks, memories, or other non-transitory computer-readable storage media. For example, the processors 204 may process sensor data from the sensors 118 and execute instructions loaded from the CRM 206 to cause them to generate an obstacle map for the parking environment, determine the path 108 (which may be referred to as a cruise trajectory) for driving toward a parking space, fulfilling a summons request, or navigating the parking environment. The instructions may cause the processor 204 to be configured to generate the path 108, which may also include a speed plan as a trajectory, for at least one automotive system using a variable grid resolution. For example, the processors 204 execute the instructions on the CRM 206 to control, based on sensor data, the autonomous-driving system 220 to operate the vehicle 102 using the path 108 to get near a selected parking space.

The parking system 120 can be stored in the CRM 206. As described above, the parking system 120 may include the parking space selector 212, the global planner 214, the motion planner 122, and the parking planner 216. The parking space selector 212 can identify available spaces or select a parking space (e.g., an optimal parking space) for the vehicle 102. The selected parking space may be presented to the driver of vehicle 102 on a display (e.g., an overlay on a photographic or video feed of the parking environment or a graphical representation of the parking environment). The parking space selector 212 may also determine nearby available spaces and present them on a video display to the driver of vehicle 102. The driver may then select the space into which the parking system 120 parks the vehicle 102.

The global planner 214 provides high-level motion planning for the parking system 120. For example, the global planner 214 may provide a reference path or trajectory to the motion planner 122 (which may also be referred to as a local planner) for navigating close to a selected parking space, fulfilling a summons request, or exiting a parking environment. The reference path provides an ideal or suggested path plan from an initial pose 104 to a goal pose 106. The global planner 214 generally uses map data for the parking environment to generate the reference path or trajectory. The map data may be stored locally in the vehicle 102 or be obtained from a remote computer system using communication devices. In other implementations, the reference path or trajectory may be a stored path for a commonly-visited parking environment (e.g., a learned or trained trajectory for parking in a designated location at the driver's home or work).

The motion planner 122 determines the path 108 for navigating the parking environment from the initial pose 104 to the goal pose 106. As described below, the motion planner 122 may determine a series of waypoints to safely navigate the parking environment (e.g., avoiding a collision with stationary objects 112 and moving objects 114). The waypoints include 2D positional coordinates and may also include time coordinates. The vehicle's heading may be determined by taking the derivative of the 2D positions (e.g., dy/dx or dS/dL). Velocity components may be determined by taking the derivative along a positional axis as a function of time (e.g., dx/dt, dy/dt, dS/dt, dL/dt).

The parking planner 216 determines a parking path (e.g., the parking path 116 of FIG. 1) to navigate from the goal pose 106 into a selected parking space (e.g., the available space 110 of FIG. 1). The parking planner 216 may also determine a maneuver type (e.g., front-in parking, back-in parking, single-turn maneuver, two-turn maneuver) for parking in the selected parking space. For example, the parking planner 216 may determine, based on parking-space characteristics, that the vehicle 102 cannot perform a single-turn maneuver into the selected parking space because the entry turning radius is smaller than the minimum inner turning radius of vehicle 102. The parking planner 216 may also determine, based on driver preferences or input, to perform a single- or two-turn maneuver followed by a back-in movement to park in the selected parking space.

The vehicle 102 also includes the control interface 218 to one or more vehicle-based systems, which individually or in combination provide a way for receiving the path 108 to control the vehicle 102. One example of vehicle-based systems to which the control interface 218 supplies parking information includes the autonomous-driving system 220, which may rely on information output from the parking system 120. For example, the autonomous-driving system 220 may rely on data, which is communicated via the communication devices 202 and obtained from the sensors 118, to operate the vehicle 102 in a crowded parking environment along the path 108 toward the goal pose 106. For example, the autonomous-driving system 220 can use data provided by the parking system 120 and/or sensors 118 to control operations of the vehicle 102 to navigate close to a selected parking space (followed by using a parking path 116 to park in the selected parking space), fulfill a summons request, or navigate through a parking environment.

Example Trajectory Planning Flowchart

Figure 3:
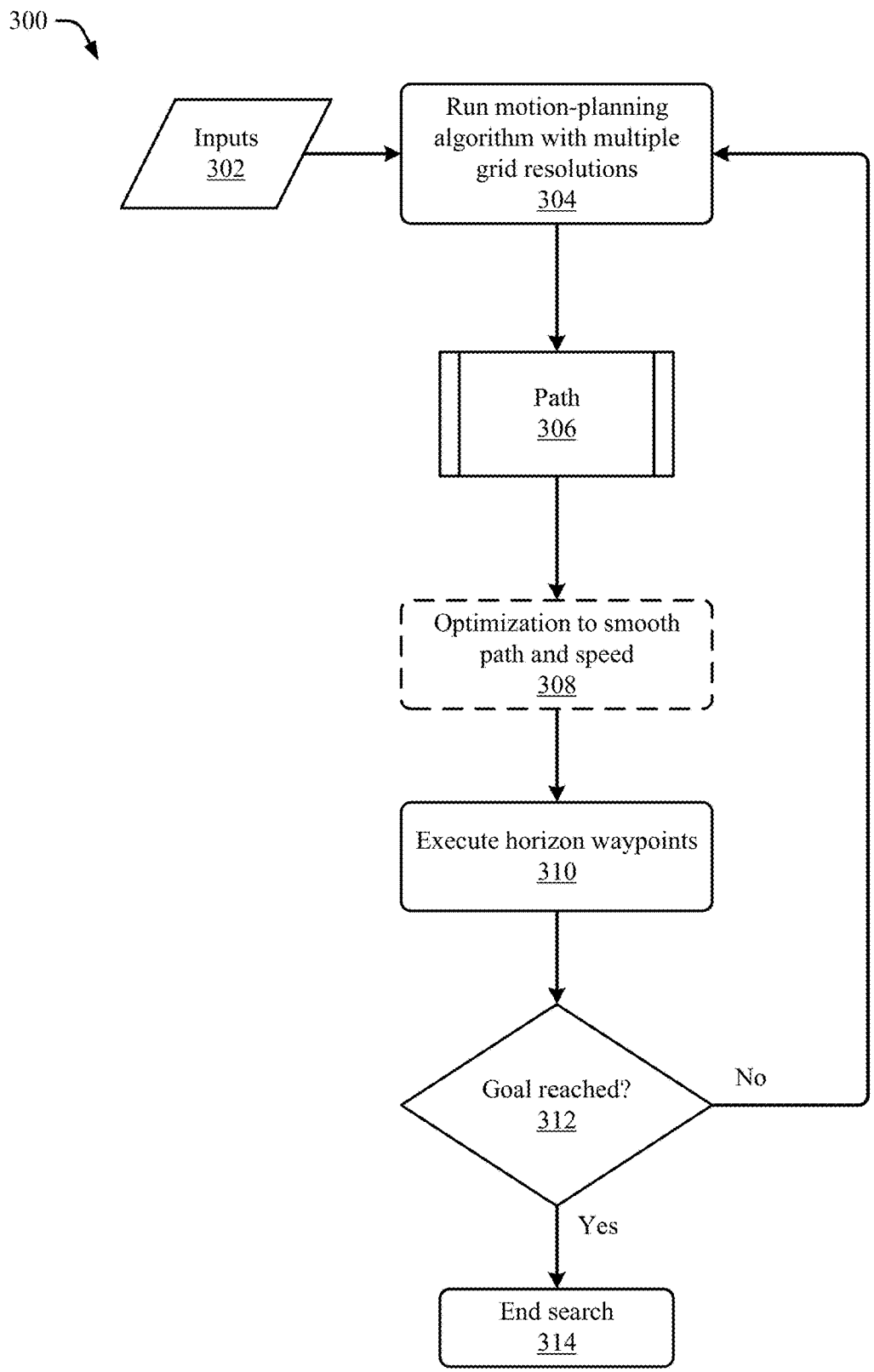
FIG. 3 illustrates an example flowchart of the described techniques and systems for motion planning using a variable grid resolution for graph-search-based planning.

FIG. 3 illustrates an example flowchart 300 of the described techniques and systems for motion planning using a variable grid resolution for graph-search-based planning. The parking system of FIG. 3 can, for example, be the parking system 120 and/or the motion planner 122 of FIGS. 1 and 2. The output of the flowchart 300 is a path 306 or trajectory, which may be provided as input to the autonomous-driving system 220 to operate vehicle 102 along the path 306 to navigate the parking environment (e.g., to get near an available space, find an available space, complete a summons request, or exit the parking lot). The path 306 may also include time coordinates to provide a trajectory output from the motion planner 122.

At step 304, the parking system 120 or the motion planner 122 obtains inputs 302 and runs a motion-planning algorithm with multiple grid resolutions. The motion-planning algorithm may be run in a 2D or 3D search space with space or space-time artificial potential fields, respectively. The 2D search space includes two positional dimensions. The 3D search space includes two positional dimensions and a time dimension.

The inputs 302 include an initial or current pose of the vehicle 102, a goal pose near a selected parking space or destination within the parking environment, and an obstacle map. The initial pose may represent a source node for the motion-planning algorithm and may be obtained from the localization system 208, which uses location data to determine the vehicle's location. The goal pose may represent a goal node for the motion-planning algorithm and may be obtained from the parking space selector 212 or another system of the parking system 120. The parking system 120 may also obtain the obstacle map for the environment near, around, between, and including the initial pose and the goal pose. The obstacle map may be obtained from the perception system 210, which uses sensor data to generate and populate the obstacle map. In some implementations, the obstacle map can be a radar occupancy grid map generated from radar data or a similar type of occupancy grid map (e.g., an occupancy grid map that fuses data from multiple types of sensors).

The motion-planning algorithm utilizes space and/or space-time artificial potential fields and a graph-based search to plan the path 306 of the vehicle 102 in the parking environment. The motion-planning algorithm first discretizes the 2D or 3D search space into an array or 2D or 3D nodes, respectively, and assigns artificial potential field values or magnitudes to each node using potential field functions. The motion-planning algorithm determines a trajectory that travels from the current position (e.g., the initial pose) to the goal position (e.g., goal pose) with the lowest cost or potential.

Two general kinds of artificial potential fields are generated within or by the motion-planning algorithm: attractive potentials and repulsive potentials. In general, the goal pose and a reference path (if provided) exhibit an attractive potential, while obstacles (e.g., moving objects 114, stationary objects 112) produce repulsive potentials. The attractive or repulsive potentials are a function of the distance (e.g., an inverse, linear, quadratic, or exponential relationship) between the vehicle 102 and the potential source. As a result, the total potential, $U_{total}(s, l, t)$, at any point or node within the parking environment is determined from the sum of the attractive potentials, $U_{attractive}(s, l, t)$, and the repulsive potentials, $U_{repulsive}(s, l, t)$, as illustrated in Equation (1):

$$U_{total}(s, l, t) = U_{attractive}(s, l, t) + U_{repulsive}(s, l, t) \quad (1)$$

Attractive potentials may be generated from reference lines, reference paths, goal lines, and goal nodes. Reference lines may represent a lateral center of a lane or implied lane for the vehicle 102 to travel within. Reference paths or trajectories may represent an ideal path or trajectories for the vehicle 102 to travel from the initial pose to the goal pose or goal line following marked lanes in the parking environment, which assumes no obstacles are present. Goal lines may represent a lateral (or another direction) line to which the vehicle 102 is to travel to either exit the parking environment or navigate it in search of an available space 110. The attractive potentials from reference paths and goal poses are illustrated in Equations (2) and (3), respectively:

$$U_{ref\_path}(s, l, t) = w_{ref\_path} d_{path} \quad (2)$$

$$U_{goal}(s, l, t) = w_{goal} d_{goal} \quad (3)$$

where $W_{ref\_path}$ and $W_{goal}$ represent weights with the same or different constant values and $d_{path}$ and $d_{goal}$ represent the Euclidian distance from the current position of the vehicle 102 to the reference path or goal pose or the smallest distance from the current position of the vehicle 102 to the reference path or goal pose, respectively.

Figures 1, 4:
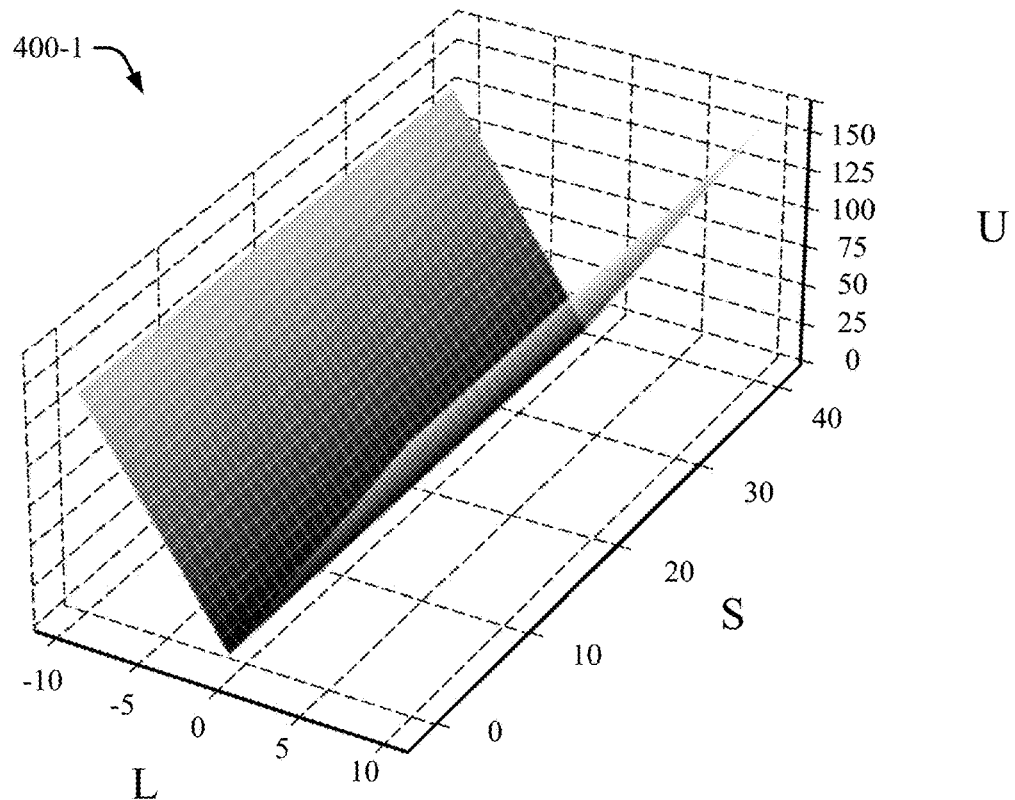
Figures 2, 4:
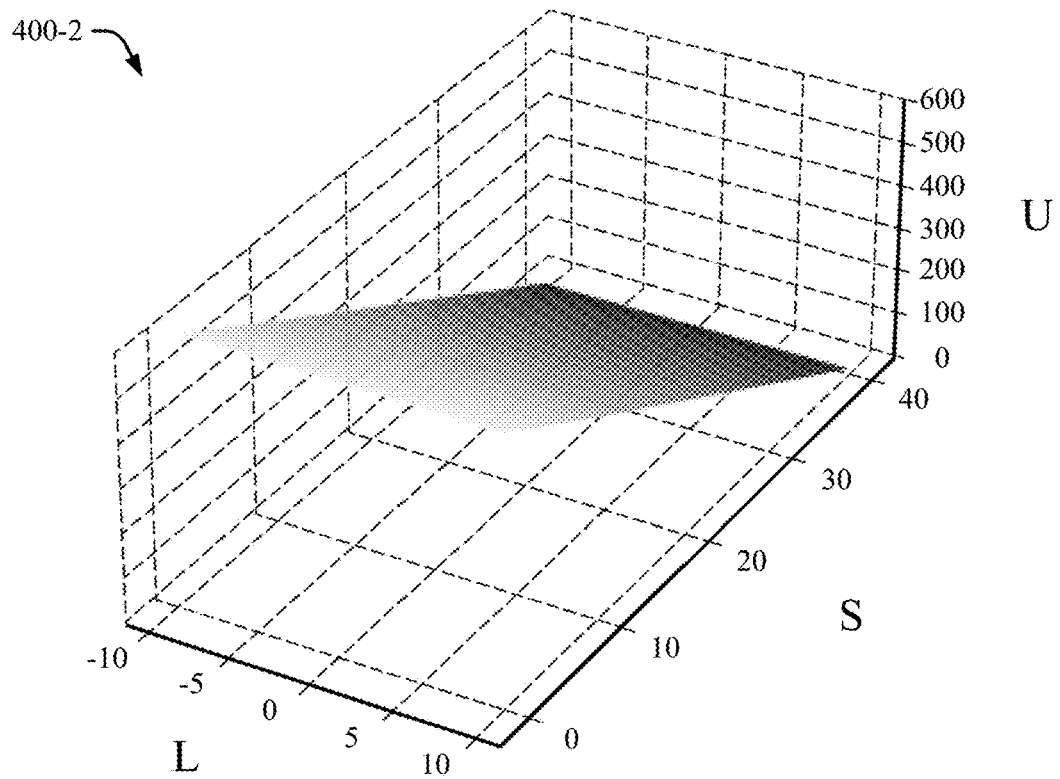
Figures 3, 4:
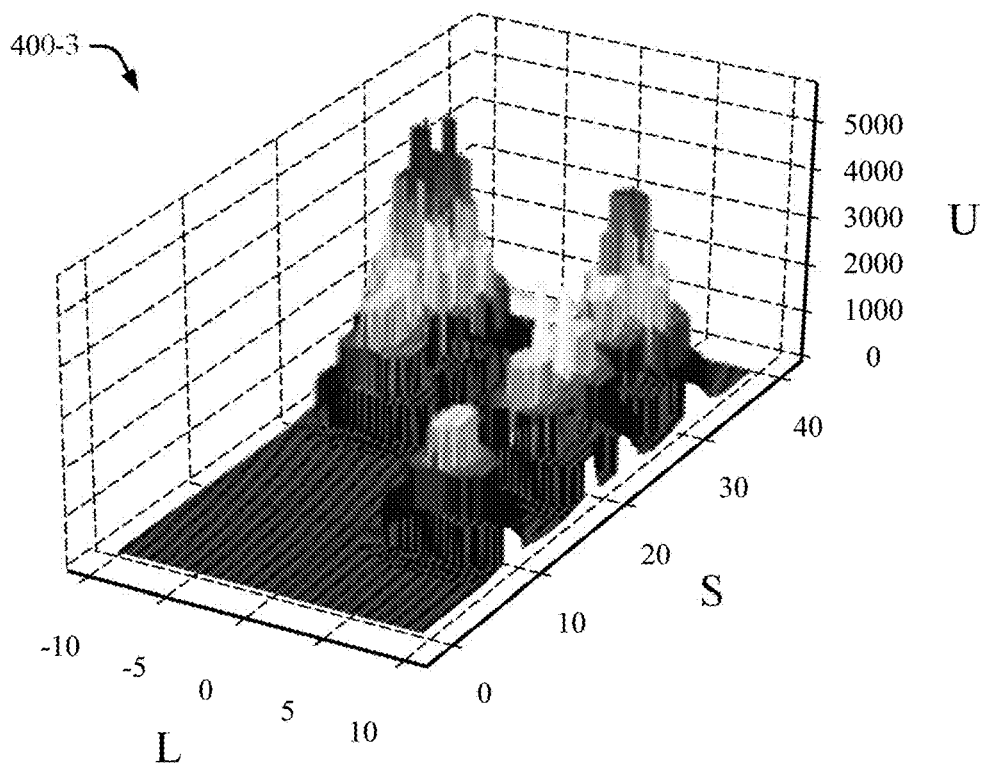
Figure 4:
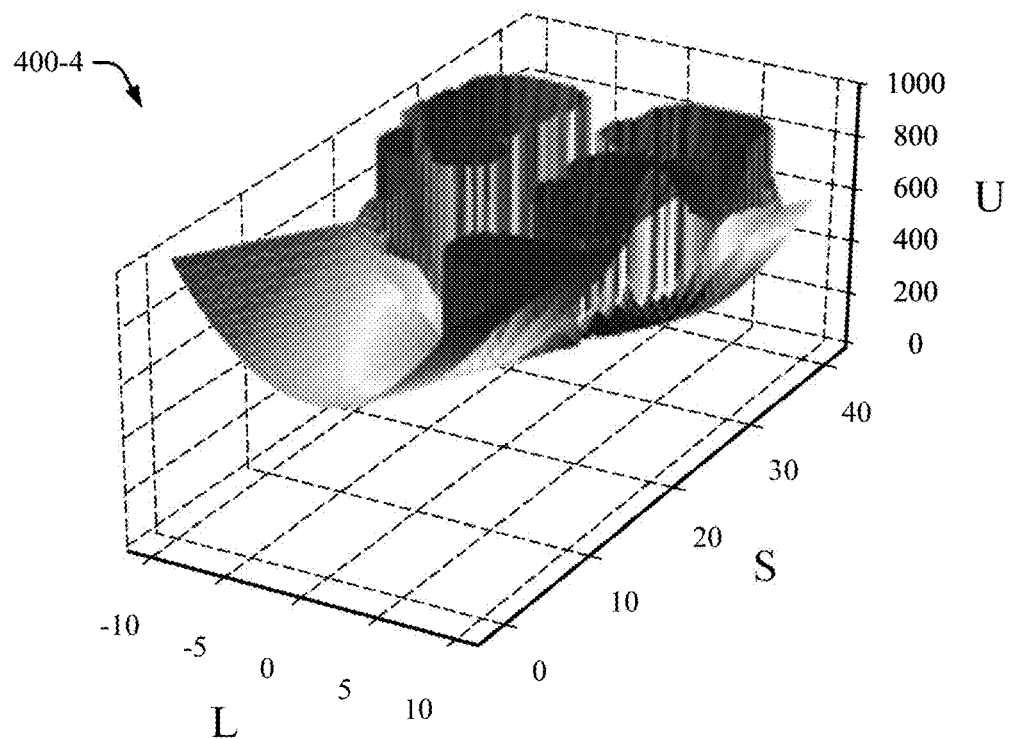

FIGS. 4-1 and 4-2 illustrate example attractive potential fields 400-1 and 400-2, respectively, used by the motion planner 122 to determine the path 306. In FIG. 4-1, graph 400-1 illustrates the attractive potential field generated by a reference path. The reference path is offset from an S-axis. The magnitude of the attractive potential linearly increases based on the lateral (L) distance to the reference path or line.

In FIG. 4-2, graph 400-2 illustrates the attractive potential field generated by a goal line. The goal line is a line with an S value of 40. The magnitude of the attractive potential linearly increases based on the distance to the goal line along the S-axis.

Repulsive potentials can be generated from boundaries and obstacles. If used, repulsive potentials by boundaries are useful for keeping the vehicle 102 away from the boundaries of the parking environment. The repulsive potentials from obstacles are illustrated in Equation (4):

$$U_{obstalce}(s, l, t) = w_{obs} * \begin{cases} C_{collision}, & d \leq d_c \\ C_{gradient}(d_g - d), & d_c < d \leq d_g \\ 0, & d > d_g \end{cases} \quad (4)$$

where $W_{obs}$ represents a weight with a constant value, d represents the distance between the vehicle 102 and the obstacle, $d_c$ represents a collision distance offset a small distance around the obstacle, dg represents a gradient distance offset around the obstacle, and $C_{collision}$ and $C_{gradient}$ represent a cost associated with being within a respective distance of the obstacle.

Figure 5:
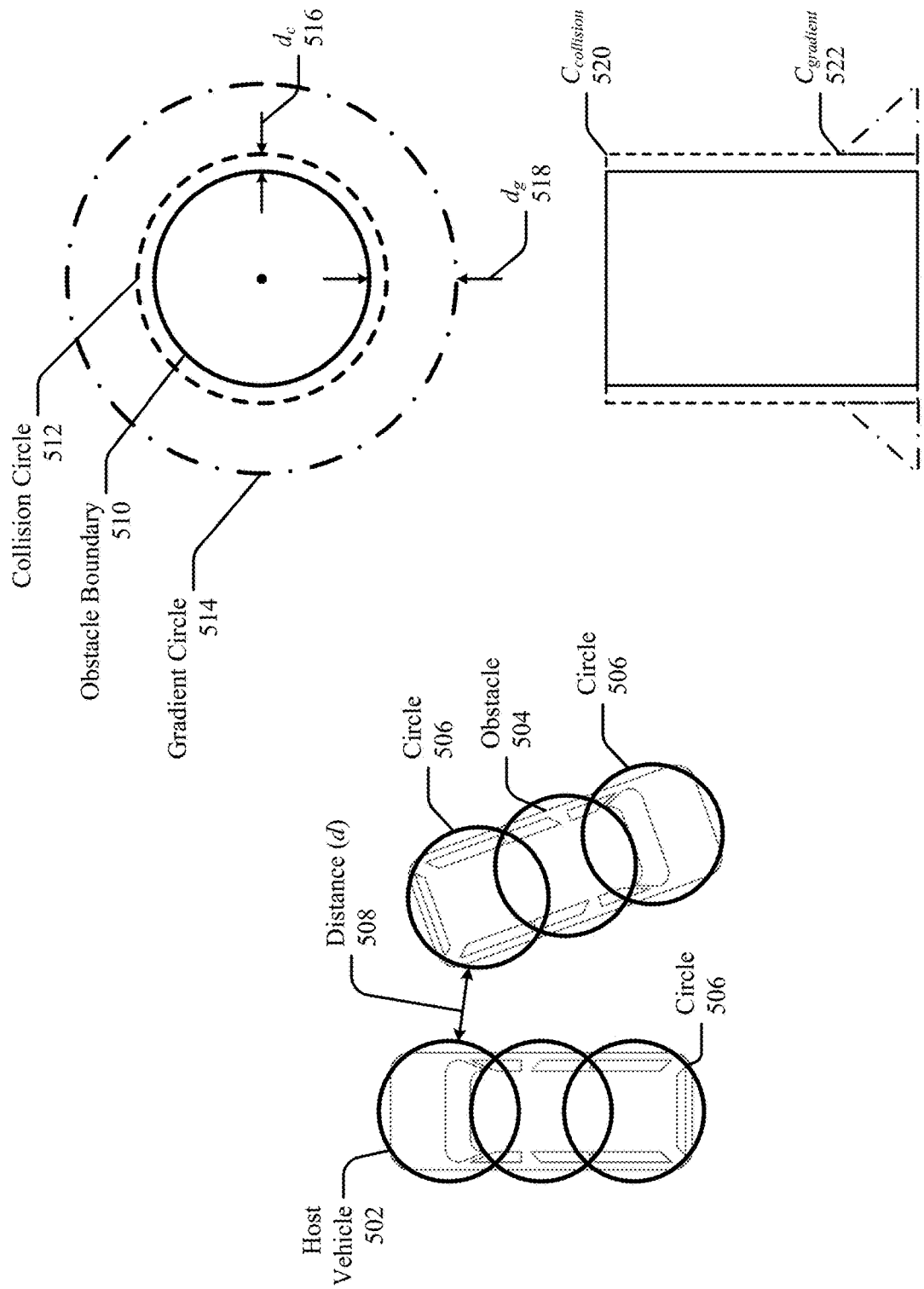
FIG. 5 illustrates example techniques for determining repulsive potentials for motion planning in a 2D or 3D search space with artificial potential fields.

FIG. 5 illustrates example techniques for determining repulsive potentials in path planning in a 2D or 3D search space with artificial potential fields. In particular, FIG. 5 illustrates a host vehicle 502 (e.g., vehicle 102 of FIGS. 1 through 3) and a nearby obstacle 504 (e.g., another vehicle). In the motion-planning algorithm, representation of the host vehicle 502 and obstacle 504 is simplified by using one or more circles. In the illustrated example, both the host vehicle 502 and the obstacle 504 are represented by three circles 506.

The distance, d, 408 from Equation (4) can be determined using Equation (5):

$$d = \sqrt{(s_{host} - s_{obs})^2 + (l_{host} - l_{obs})^2} - r_{host} - r_{obs} \quad (5)$$

where $S_{host}$ and $S_{obs}$ represent the s-coordinates of the circle centers of the host vehicle 502 and the obstacle 504, respectively; $l_{host}$ and $l_{obs}$ represent the l-coordinates of the circle centers of the host vehicle 502 and the obstacle 504, respectively; and $r_{host}$ and $r_{obs}$ represent the radius of the circles 506 representing the host vehicle 502 and the obstacle 504, respectively.

In Equations (1) through (5), the positional coordinates are provided in station (S or s) and lateral (L or l) dimensions. The S dimension indicates a distance along a path and the L dimension indicates a perpendicular offset from the path. Cartesian coordinates may also be used to represent the 2D search space with an x-axis and y-axis normal to each other in either a global coordinate system or a vehicle coordinate system. Similarly, polar coordinates or another positional coordinate system may be used for the 2D positional search space in the space field or space-time field.

The collision distance offset, $d_c$, 516 represents the distance between an obstacle boundary 510 and a collision circle 512 of the obstacle 504. The obstacle boundary 510 represents the approximate boundary of the obstacle 504, which is represented by the circle(s) 506. The collision circle 512 represents an area within which a collision with the obstacle 504 occurs or is likely to occur. The gradient distance offset, de, 518 represents the distance between a gradient circle 514 and the obstacle boundary 510. The gradient circle 514 represents an area within which the repulsive potential from the obstacle linearly decreases. In other implementations, the repulsive potential can decrease at a quadratic, exponential or some other rate within the gradient circle 514. The collision cost, $C_{collision}$, 520 and the gradient cost, $C_{gradient}$, 522 represent the cost for the vehicle 502 being within the collision circle 512 or the gradient circle 514, respectively, of the obstacle 504. For example, the collision cost, $C_{collision}$, 520 and the gradient cost, $C_{gradient}$, 522 may have values of 100 and 25, respectively. In other implementations, different values can be used for both the collision cost, $C_{collision}$, 520 and the gradient cost, $C_{gradient}$, 522.

FIG. 4-3 illustrates example repulsive potential fields 400-3 used by the motion planner 122 to determine the path 306. Graph 400-3 illustrates the repulsive potential fields generated by nine parked vehicles in the parking environment. The magnitude of the repulsive potential fields increases as the vehicle 102 nears the respective object(s).

FIG. 4-4 illustrates example artificial potential fields 400-4 used by the motion planner 122 to determine the path 306 for a single point in time. In particular, graph 400-4 illustrates the combination of the attractive and repulsive potentials or potential fields from graphs 400-1, 400-2, and 400-3.

The result of the motion-planning algorithm is the path 306. The path 306 includes a series of 2D or 3D waypoints with 2D positional coordinates and time coordinates (if 3D waypoints) for the vehicle 102 to navigate from the initial pose toward the goal pose. The 2D positional coordinates are expressed in terms of the two positional dimensions (e.g., within an SL plane). The slope of the positional coordinates (e.g., dS/dL) indicate a heading of the vehicle 102. The location provided by the positional coordinates may be expressed in a vehicle coordinate system or a global coordinate system. If time coordinates are provided, the time coordinates may be used to determine velocity components of the path 306. In particular, the longitudinal velocity component is indicated by the slope in the ST plane (e.g., dS/dT) and the lateral velocity component is indicated by the slope in the LT plane (e.g., dL/dT).

At optional step 308, the motion planner 122 optimizes the path 306 to smooth the path and speed of the vehicle 102 together. For example, the motion planner 122 can optimize the path 306 reduce curvature, acceleration, or any jerkiness using inequality constraints.

As another example, the motion planner 122 can introduce a speed penalty to minimize occurrences of the vehicle 102 traveling faster or slower than a reference speed. The speed penalty may also include a maximum speed or minimum speed that may not be exceeded. Similarly, the motion planner 122 may also consider kinematic constraints (e.g., steering limits) and dynamic constraints (e.g., changes in elevation of the roadway that may, for example, occur on a ramp) to introduce other penalties to influence or optimize the path 306. In other implementations, these penalties and constraints may be integrated as part of the motion-planning algorithm in step 304.

At step 310, the parking system 120 or the autonomous-driving system 220 executes horizon waypoints from the path 306. The horizon waypoints represent a subset of the path 306, which are determined using a first or fine grid resolution. For example, the horizon waypoints may represent the path 306 for a two-second cycle or execution time. As a result, the motion planner 122 provides the 2D or 3D waypoints required to execute two seconds of the path 306 and then replans the remainder of the path 306 to account for updated information (e.g., changes to the track of a moving object 114 or perception of a new object). In the initial motion planning, the remainder of the path 306 is determined using one or more coarser grid resolutions to reduce the computation cost of the path planning. The horizon waypoints may represent a different execution time (e.g., one second) or a distance threshold (e.g., ten meters or ten percent of the total path). In this way, the parking system 120 performs a receding horizon scheme by searching for a longer path or trajectory but only executing a small part of it and then replanning in a computationally-efficient manner.

At step 312, the parking system 120 determines whether the goal pose was reached. If not, then the parking system 120 returns to step 304 and the motion planner 122 runs the motion-planning algorithm in the 2D or 3D search space with artificial potential fields and multiple grid resolutions to replan the rest of the path 306. For example, the new or updated path 306 will be determined using the fine grid resolution for a different section of the path than was used in the previous iteration of the path 306. In other words, the fine grid resolution is used for the new series of horizon waypoints that will be executed in the current iteration of flowchart 300. If the goal pose has been reached, then the motion planning is ended at operation 314.

Figure 6:
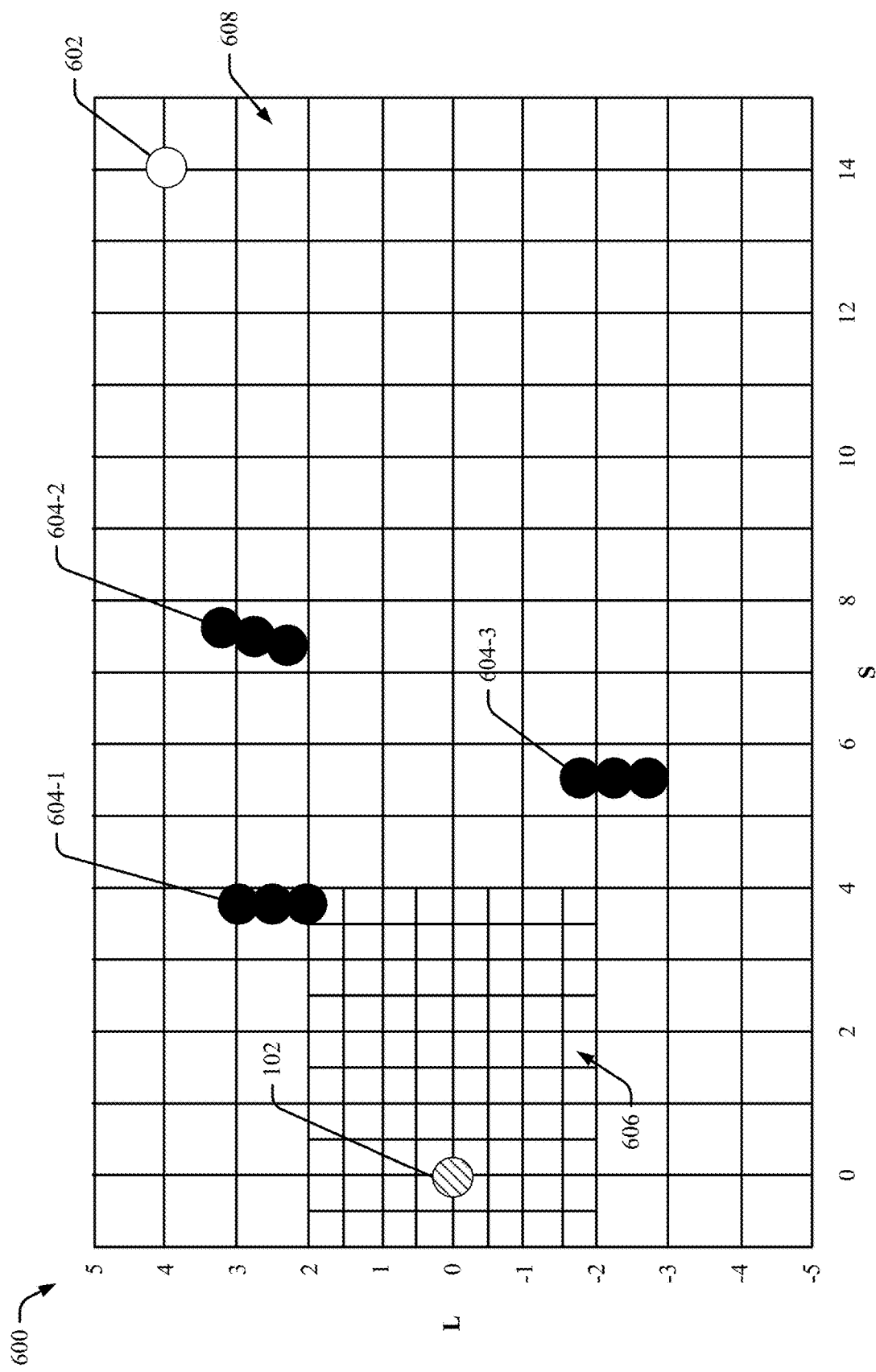
FIG. 6 illustrates an example 2D search space with variable grid resolution for graph-search-based planning.

FIG. 6 illustrates an example 2D search space 600 with variable grid resolution for graph-search-based planning. In particular, the 2D search space 600 is an example search space used for motion planning in the flowchart 300 of FIG. 3.

The 2D search space 600 includes a station (S) dimension or axis that indicates a distance along a path and a lateral (L) dimension or axis that indicates a perpendicular offset from the path. Cartesian coordinates may also represent the 2D search space 600 with an x-axis and y-axis normal to each other in either a global coordinate system or a vehicle coordinate system. Similarly, polar coordinates may be used for the 2D search space 600.

In FIG. 6, the vehicle 102 begins (e.g., an initial pose) at position (0,0) and is traveling toward a goal pose 602 at position (14,4). The 2D search space 600 also includes stationary objects 604-1, 604-2, and 604-3 (e.g., parked vehicles).

In the immediate vicinity of the vehicle 102, the motion planner 122 uses a first grid resolution 606 with a half-unit by half-unit resolution. The units of the 2D search space 600 may be meters, miles, feet, kilometers, or similar units for length. For example, the first grid resolution 606 may provide a search-space resolution of 0.5 m by 0.5 m. A different resolution may be used in other implementations of the 2D search space 600 for one or both dimensions. In FIG. 6, the first grid resolution 606 extends 4 units in the S dimension and 2 units in the L dimension. In other implementations, the first grid resolution 606 may extend a shorter or longer distance in one or both dimensions. The size of the first grid resolution 606 may be based on the expected distance for the vehicle 102 to cover in a predetermined time period (e.g., one second), a predetermined size, or a predetermined percentage of the distance between the initial pose and the goal pose 602.

Further away from the vehicle 102, the motion planner 122 uses a second grid resolution 608 with a one-unit by one-unit resolution. For example, the second grid resolution 608 may provide a search-space resolution of 1 m by 1 m. A different resolution may be used in other implementations of the 2D search space 600 for one or both dimensions. In FIG. 6, the second grid resolution 608 is twice as coarse in both dimensions as the first grid resolution 606. In other implementations, the second grid resolution 608 may be a different factor number greater than the first grid resolution 606 in one or both dimensions (e.g., four times larger in both dimensions, four times larger along the S dimension and three times larger along the L dimension).

In FIG. 6, the second grid resolution 608 extends to encompass the goal pose 602. In other implementations, the second grid resolution 608 may extend a shorter or longer distance in one or both dimensions. The size of the second grid resolution 608 may be based on the location of the goal pose 602, a reference path, or the expected distance for the vehicle 102 to cover in a predetermined time period (e.g., four seconds). In other implementations, the motion planner 122 may use three or more grid resolutions and the second grid resolution 608 may be based on the expected distance for the vehicle 102 to cover in a predetermined period (e.g., four seconds) that extends beyond the first grid resolution 606.

As the vehicle 102 travels along the path 306 toward the goal pose 602, the motion planner 122 iteratively runs the motion-planning algorithm to update the path 306. In each iteration or cycle of running the motion-planning algorithm, the position of the first grid resolution 606 shifts to account for the current position of the vehicle 102 and to provide the finer resolution for the initial portion of the updated path 306. In this way, the motion planner 122 uses a dynamic multi-resolution grid that positionally shifts in each cycle.

Figure 7:
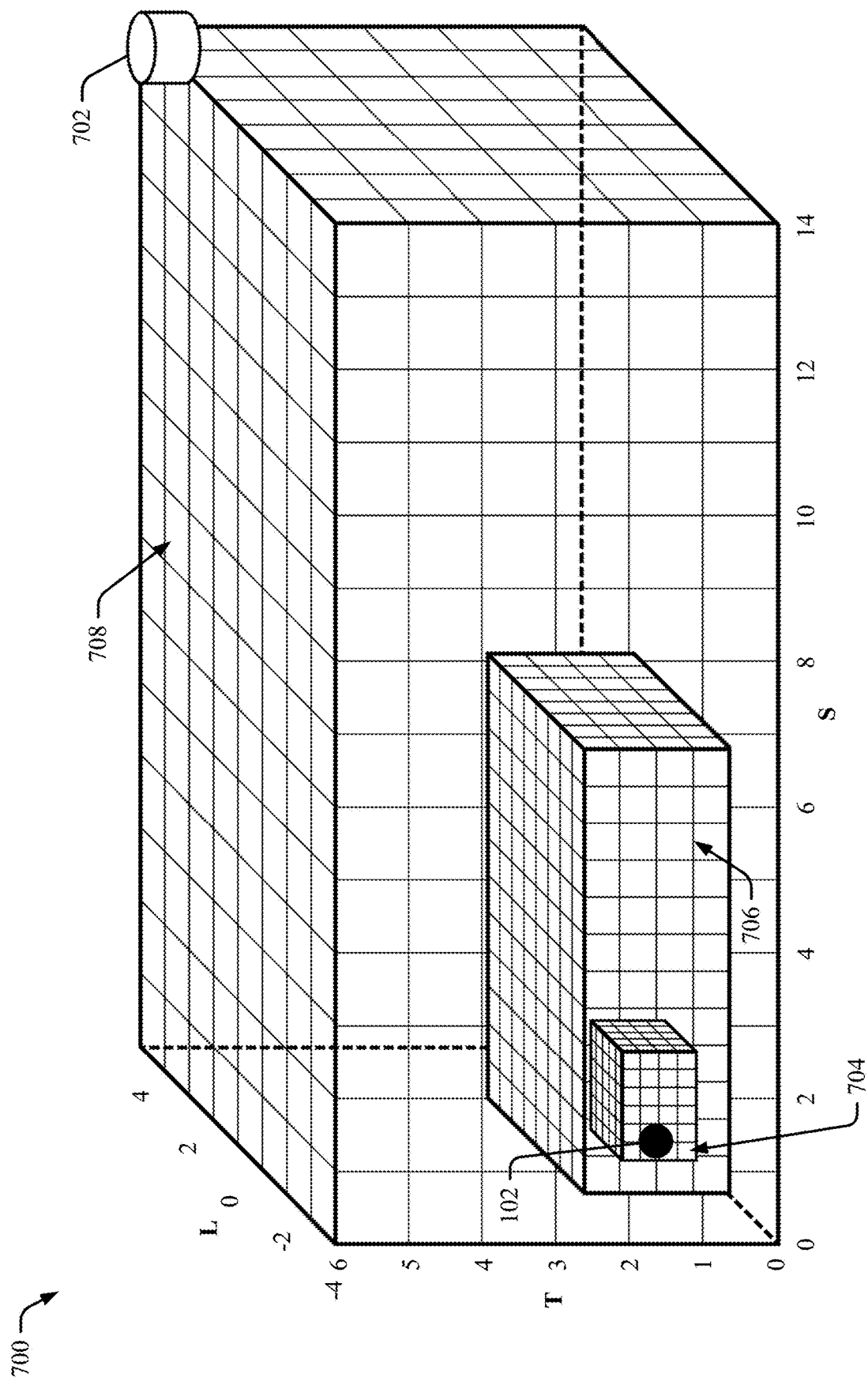
FIG. 7 illustrates an example 3D search space with variable grid resolution for graph-search-based planning.

FIG. 7 illustrates an example 3D search space 700 with variable grid resolution for graph-search-based planning. In particular, the 3D search space 700 is another example search space used for motion planning of the flowchart 300 in FIG. 3.

The 3D search space 700 adds a time (T) dimension to the station (S) dimension and the lateral (L) dimension of the 2D search space 600. As described above, the S and L spatial dimensions may be replaced with cartesian coordinates or polar coordinates in either a global coordinate system or a vehicle coordinate system.

In FIG. 7, the vehicle 102 begins at an initial position (e.g., initial pose) and is traveling toward a goal pose 702. In the immediate vicinity of the vehicle 102, the motion planner 122 uses a first grid resolution 704 with a quarter-unit by quarter-unit by quarter-unit resolution. The units of the 3D search space 700 may be meters, miles, feet, kilometers, or similar units for the S and L dimensions and seconds for the T dimension. For example, the first grid resolution 704 may provide a search-space resolution of 0.25 m, 0.25 m, and 0.25 s for the S, L, and T dimensions, respectively. A different resolution may be used in other implementations of the 3D search space 700 for one or more of the S, L, and T dimensions. In the example of FIG. 7, the first grid resolution 704 extends 1.5 units in the S dimension, 1.25 units in the L dimension, and 1 unit in the T dimension. In other implementations, the first grid resolution 704 may extend a shorter or longer distance in one or more dimensions. The size of the first grid resolution 704 may be based on the expected distance for the vehicle 102 to cover in a predetermined time period (e.g., one second).

Further away from the vehicle 102, the motion planner 122 uses a second grid resolution 706 with a half-unit by half-unit by half-unit resolution. For example, the second grid resolution 706 may provide a search-space resolution of 0.5 m, 0.5 m, and 0.5 s for the S, L, and T dimensions, respectively. A different resolution may be used in other implementations of the 3D search space 700 for one or more of the S, L, and T dimensions. In FIG. 7, the second grid resolution 706 is twice as coarse in all three dimensions as the first grid resolution 704. In other implementations, the second grid resolution 706 may be a different factor number greater than the first grid resolution 704 in one or more dimensions.

Yet further away from the vehicle 102, the motion planner 122 uses a third grid resolution 708 with a one-unit by one-unit by one-unit resolution. For example, the third grid resolution 708 may provide a search-space resolution of 1 m, 1 m, and 1 s for the S, L, and T dimensions, respectively. A different resolution may be used in other implementations of the 3D search space 700 for one or more of the S, L, and T dimensions. In FIG. 7, the third grid resolution 708 is twice as coarse in all three dimensions as the second grid resolution 706. In other implementations, the third grid resolution 708 may be a different factor number greater than the second grid resolution 706 in one or more dimensions.

In FIG. 7, the third grid resolution 708 extends to encompass the goal pose 702. In other implementations, the third grid resolution 708 may extend a shorter or longer distance in one or more dimensions. The size of the third grid resolution 708 may be based on the location of the goal pose 702, a reference path, or the expected distance for the vehicle 102 to cover in a predetermined time period (e.g., four seconds). In other implementations, the motion planner 122 may use fewer or more grid resolutions. In yet other implementations, the T dimension (or another dimension) may have the same resolution in two or more of the first grid resolution 704, the second grid resolution 706, and the third grid resolution 708.

Figures 1, 8:
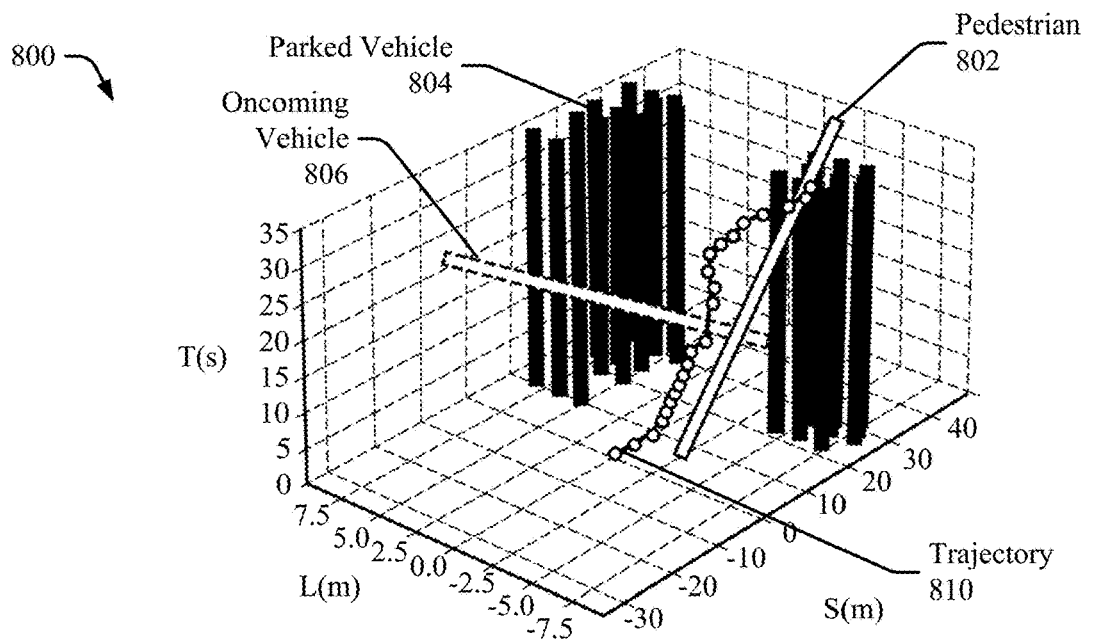
Figures 2, 8:
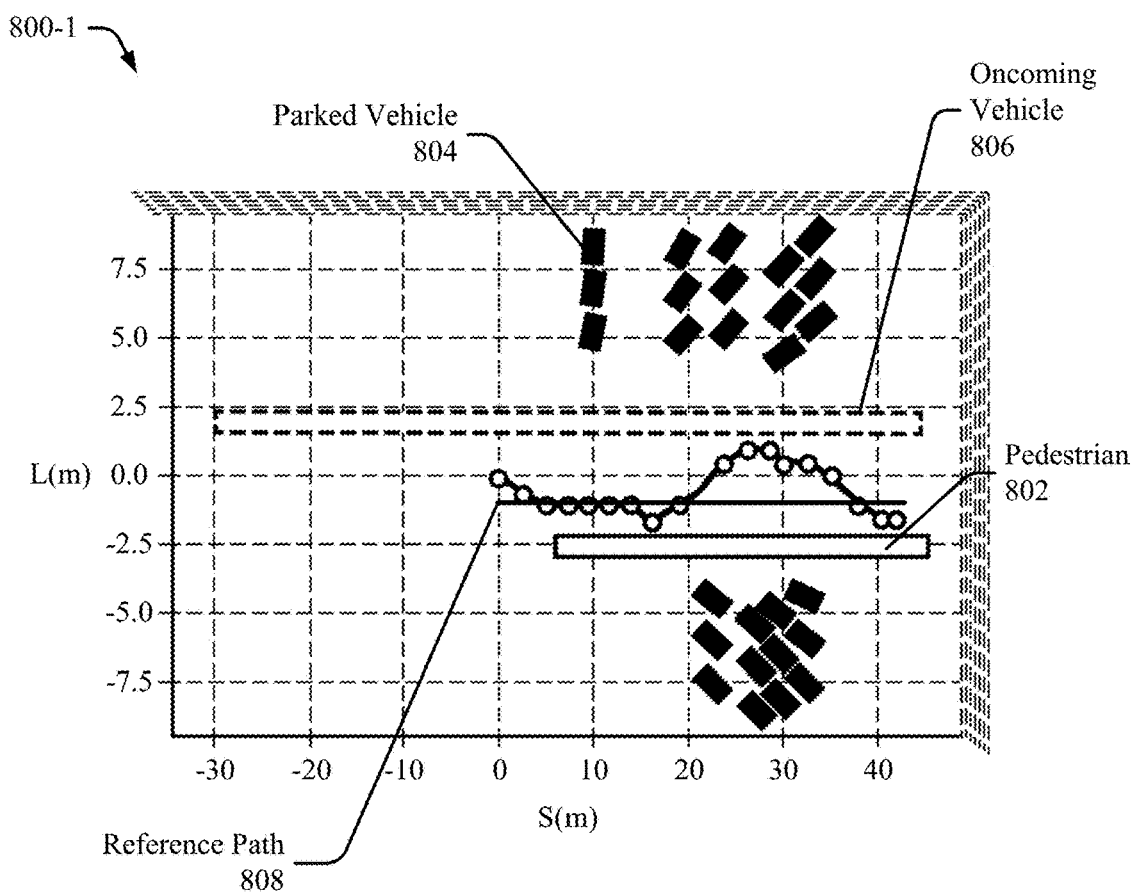
Figures 3, 8:
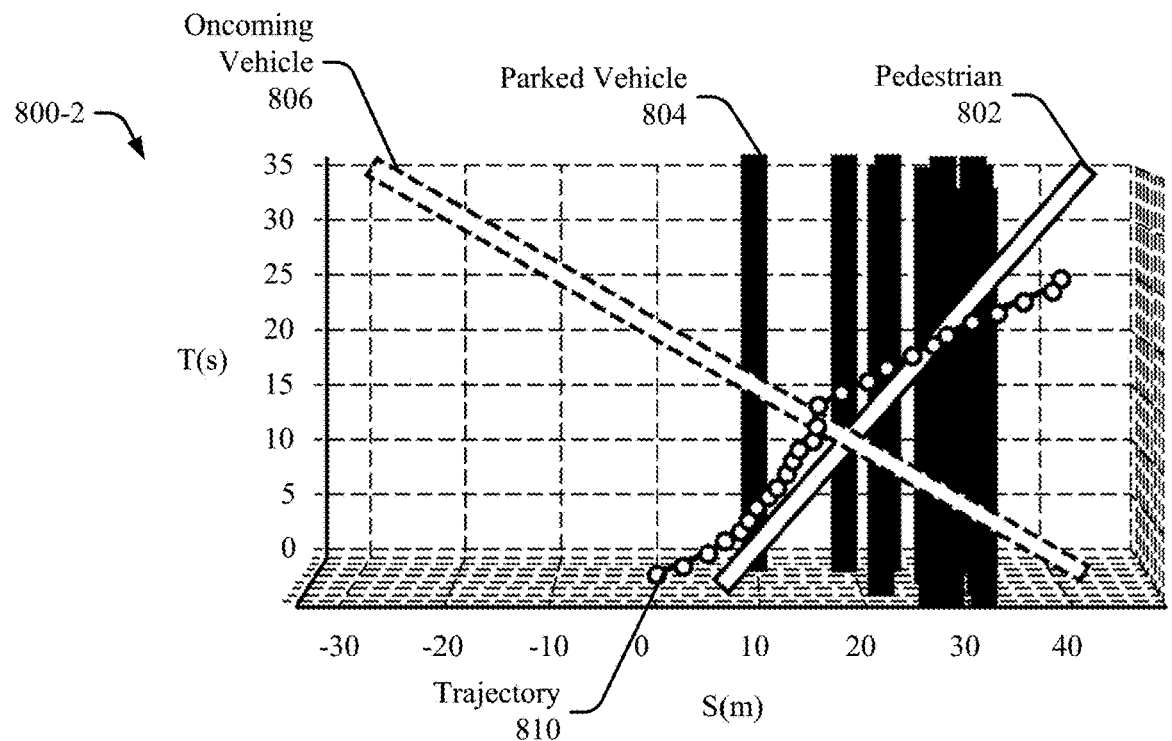
Figures 4, 8:
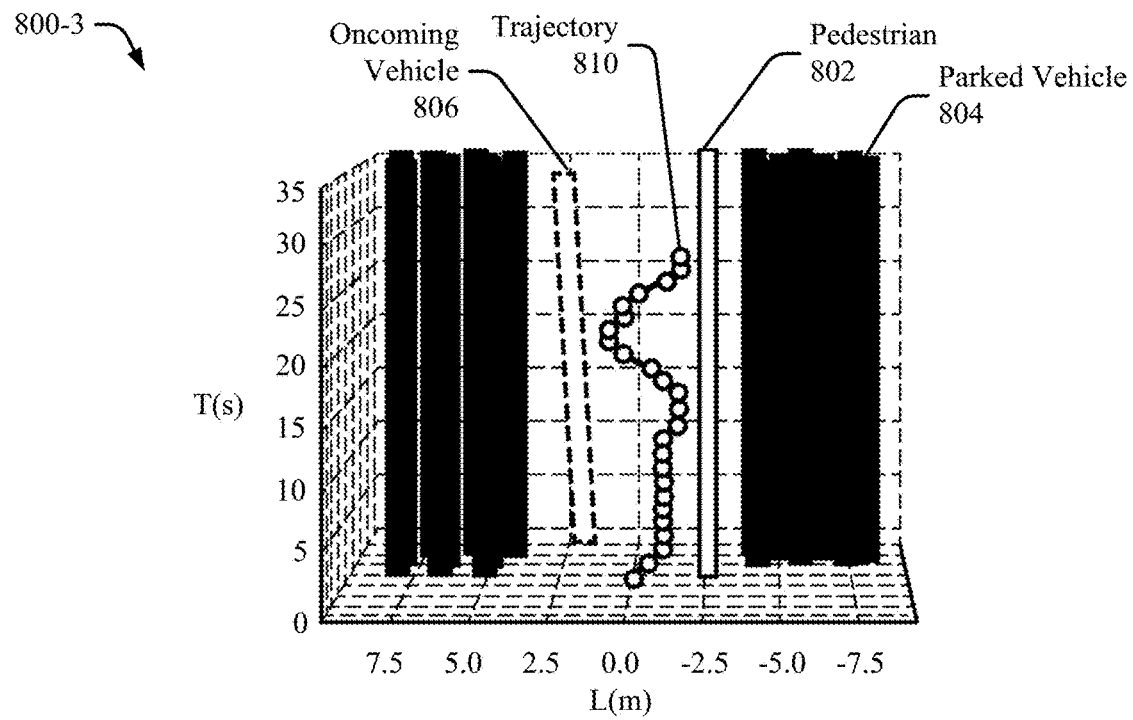

FIGS. 8-1 through 8-4 illustrate an example 3D search space 800 for motion planning. In particular, FIG. 8-1 illustrates the 3D search space 800 of the environment and motion planning from FIG. 3 as an example 3D search space occupied by obstacles and the trajectory 810.

The 3D search space 800 adds a time (T) dimension to a traditional 2D search space for motion planning. As illustrated in FIGS. 8-1 through 8-4, the 2D positional search space may be represented by a station (S) dimension that indicates a distance along a path and a lateral (L) dimension that indicates a perpendicular offset from the path. Cartesian coordinates may also represent the 2D positional search space with an x-axis and y-axis normal to each other in either a global coordinate system or a vehicle coordinate system. Similarly, polar coordinates may be used for the 2D positional search space.

In FIG. 8-1, the 3D search space 800 includes a longitudinal S-axis, a lateral L-axis, and a vertical T-axis. Stationary objects (e.g., parked vehicles 804) appear as vertical lines relative to the S-L plane because their position is independent of time. Moving objects (e.g., an oncoming vehicle 806 and a pedestrian 802) may appear as straight lines in the 3D search space 800 if they are predicted to have a uniform velocity. The slope of the line for a moving object represents its predicted velocity. The trajectory 810 is illustrated as a B-spline curve with its 3D waypoints illustrated as circles.

In FIG. 8-2, a 2D SL search space 800-1 is illustrated. The 2D SL search space 800-1 is a projection of the 3D search space 800 onto the S-L plane. The position of parked vehicles 804 remains as a dot, which looks like a rectangle due to the perspective view. In contrast, the position of the pedestrian 802 and the oncoming vehicle 806 appear as a line because of their predicted movement over time. The trajectory 810 indicates how the vehicle 102 deviated from the reference path 808 as it swerved to provide a greater offset between it and the oncoming vehicle 806 and the pedestrian 802.

In FIG. 8-3, a 2D ST search space 800-2 is illustrated. The 2D ST search space 800-2 is a projection of the 3D search space 800 onto the S-T plane. The position of the parked vehicles 804 is represented as a vertical line because their positions do not change over time. In contrast, the position of the pedestrian 802 appears as a straight line with a positive slope as the pedestrian 802 is predicted to travel at a uniform speed in the same direction as the vehicle 102. The position of the oncoming vehicle 806 appears as a straight line with a negative slope as it travels at a uniform speed toward and beyond the vehicle 102. The trajectory 810 indicates the S position of the vehicle 102 over time. The vehicle 102 briefly stops to allow the oncoming vehicle 806 to pass before passing the pedestrian 802, resulting in the slope of the trajectory 810 being vertical. The instantaneous longitudinal velocity of the vehicle 102 can be determined as the inverse of the instant slope at any point along the trajectory 810.

In FIG. 8-4, a 2D LT search space 800-3 is illustrated. The 2D LT search space 800-3 is a projection of the 3D search space 800 onto the L-T plane. The position of the parked vehicles 804 is represented as a vertical line because their positions are predicted to not change over time. Similarly, the position of the pedestrian 802 appears as a vertical line because the lateral position of the pedestrian is predicted to not change over time (e.g., the pedestrian walks in a straight line with a uniform offset from the reference path 808). Similarly, the position of the oncoming vehicle 806 appears as a vertical line (which looks like a straight line with a small negative slope due to the perspective view) because lateral position of the vehicle is predicted to not change. The trajectory 810 indicates the L position of the vehicle 102 over time as it swerved to make room for the oncoming vehicle 806 and then swerved in the opposite lateral direction to pass the pedestrian 802. The instantaneous lateral velocity of the vehicle 102 can be determined as the inverse of the instant slope at any point along the trajectory 810.

Figures 1, 9:
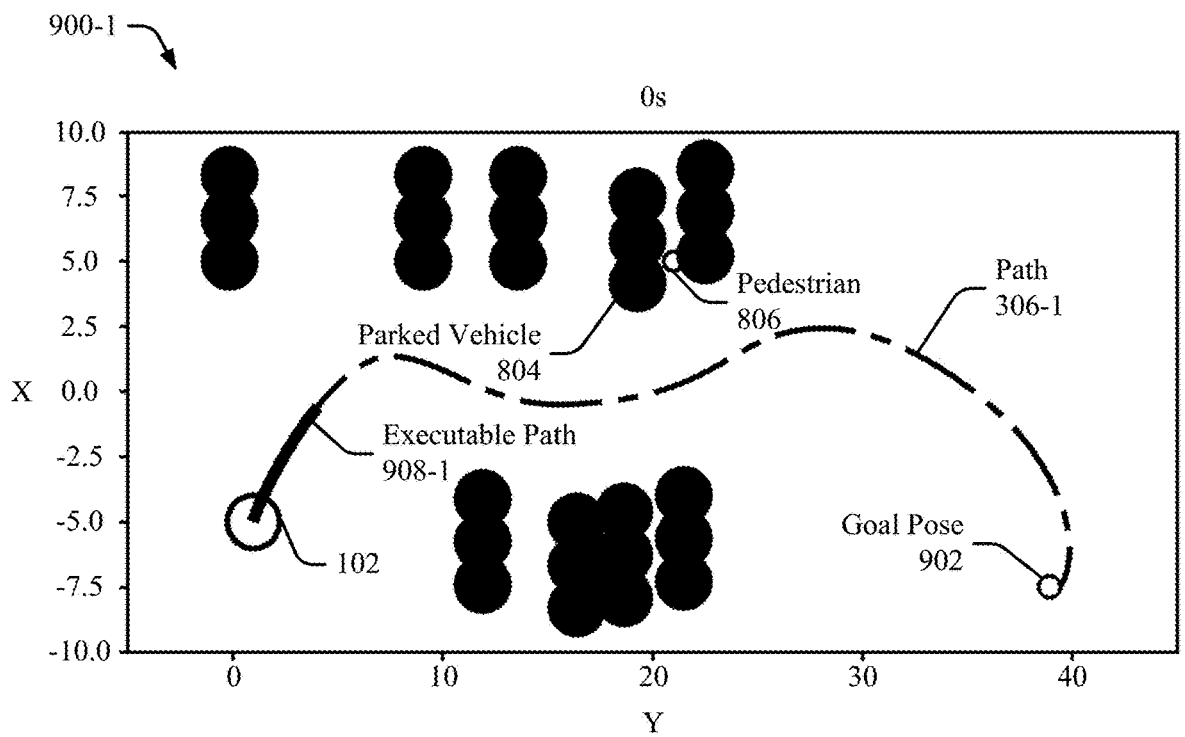
Figures 2, 9:
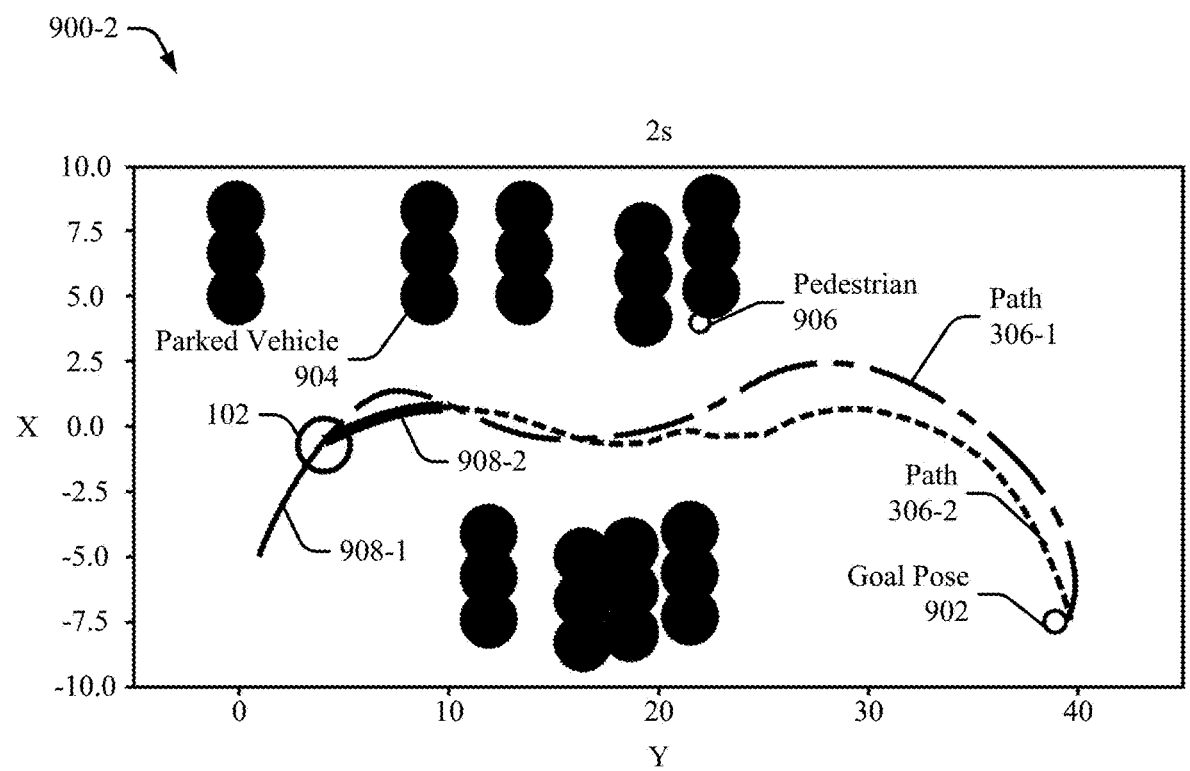
Figures 3, 9:
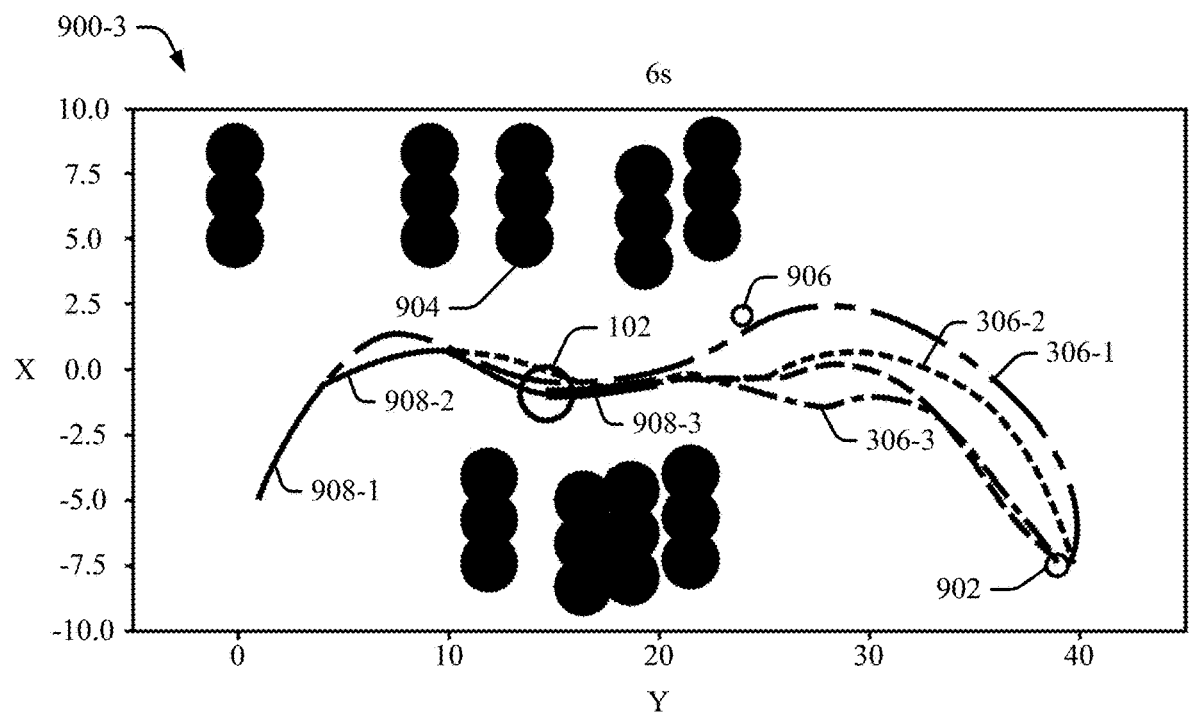
Figures 4, 9:
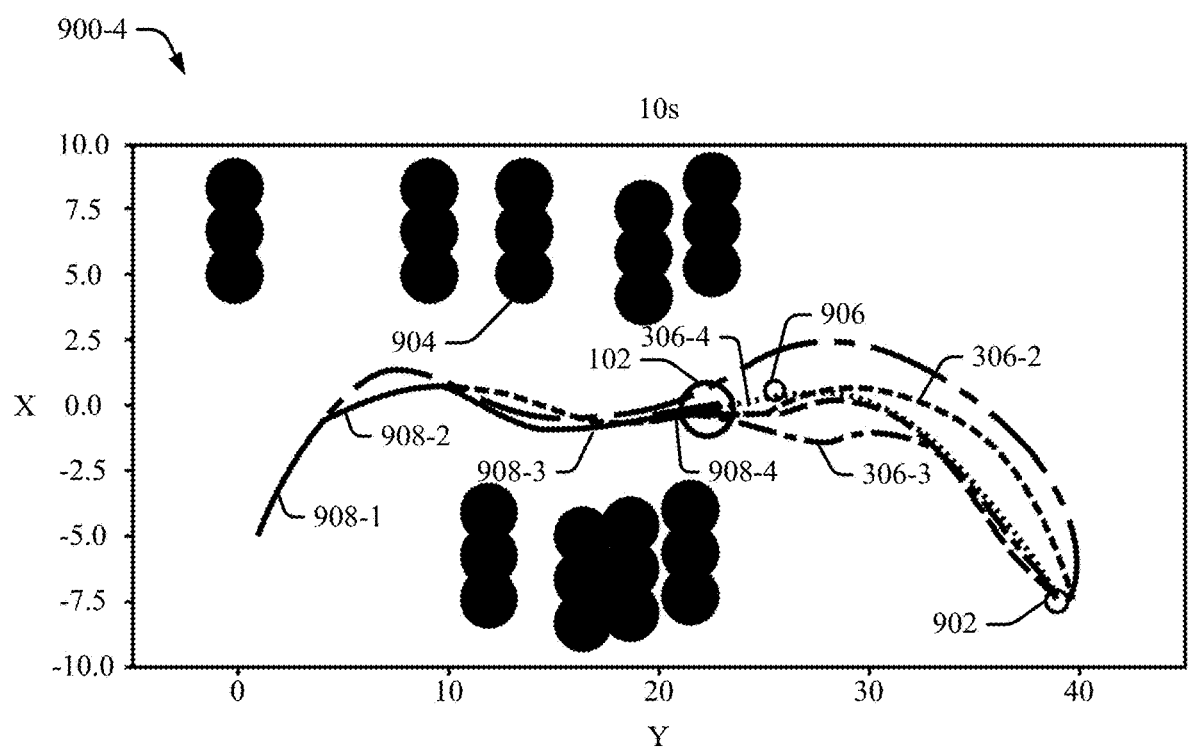
Figures 5, 9:
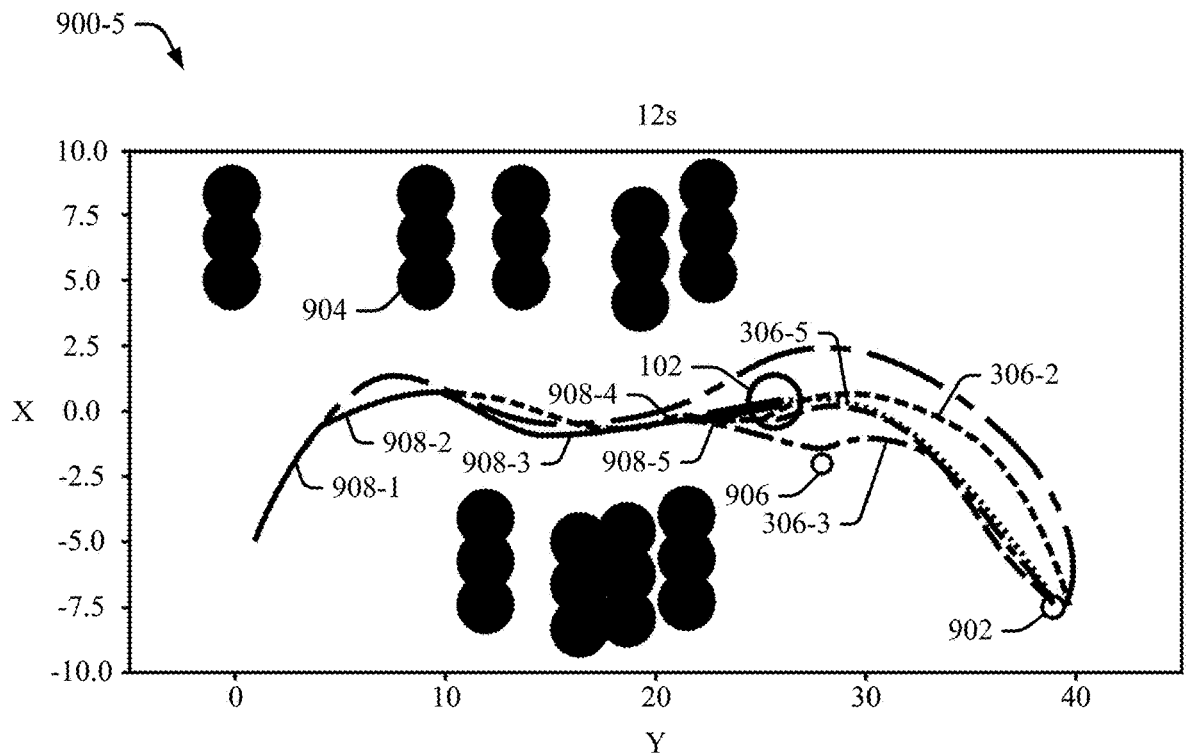
Figures 6, 9:
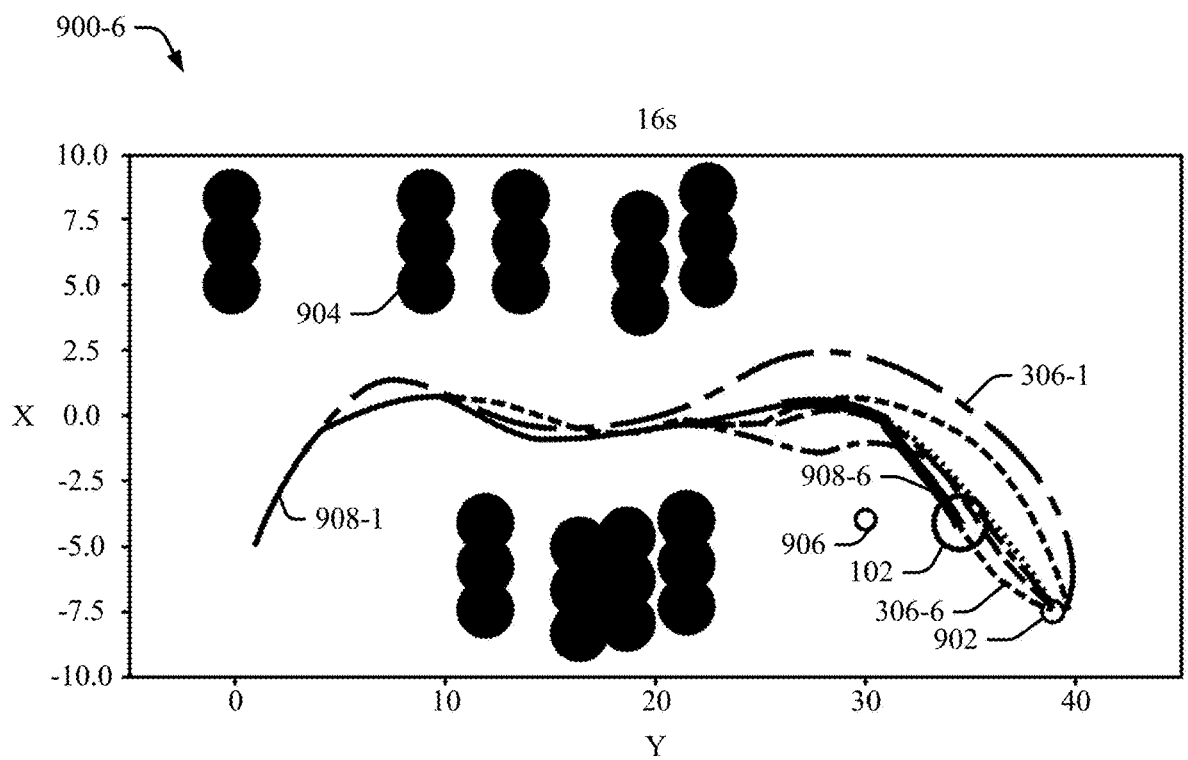

FIGS. 9-1 through 9-6 illustrate an example path 306 (or trajectory) of the vehicle 102 with the parking system 120 using a dynamic grid with variable resolution for graph-search-based planning. The path 306 is illustrated using graphs 900 that illustrate snapshots of the travel of vehicle 102 in a parking environment. Graphs 900 provide different snapshots of the 2D XY search space over time as the vehicle 102 travels toward a goal pose 902. The position of the vehicle 102 is represented using the Y-axis (e.g., longitudinally ahead of the vehicle) and an X-axis perpendicular to the Y-axis. The environment includes multiple stationary objects, specifically nine parked vehicles 904. The parked vehicles 904 define a drivable aisle in which the vehicle 102 may navigate objects and travel. The environment also includes a moving object, specifically a pedestrian 906. The pedestrian 906 is slowing moving perpendicular to the drivable aisle and the path 306.

In graph 900-1 of FIG. 9-1, the vehicle 102 is beginning to travel along a path 306-1 in the positive Y direction. Graph 900-1 is taken at the outset of the path 306-1 with T equal to 0 seconds. The pedestrian 906 is walking in between two parked vehicles 904 toward the drivable aisle but is positioned to the left of it. The path 306-1 includes an executable path 908-1 that is generated using a fine grid resolution. For example, the executable path 908-1 may be executed using a grid resolution of 0.5 m in both the X and Y dimensions and 0.5 seconds in the T dimension, while the grid resolution of the remainder of the path 306-1 is executed using a grid resolution of 1.0 m in both the X and Y dimensions and 1.0 seconds in the T dimension. In other examples, a third and more coarse grid resolution may be used for a final portion of the path 306-1. The executable path 908-1 may represent the portion of the path 306-1 executable in two seconds (or another time span), the first five meters of the path 306-1 (or another set distance), or ten percent (or another percentage) of the path 306-1.

In graph 900-2 of FIG. 9-2 with T equal to 2 seconds, the vehicle 102 has executed the executable path 908-1. The pedestrian 906 is now a short distance to the left of the drivable aisle. Upon completion of the executable path 908-1, the parking system 120 replans the path 306 and generates an updated path 306-2. In other implementations, the parking system 120 can replan the path 306 upon detecting a new object in the vicinity of the current path or a short time before completion of the previous executable path (e.g., the executable path 908-1). Because the pedestrian 906 is now near the drivable aisle, the path 306-2 moves toward the center of the drivable aisle as it passes the current position of the pedestrian 906. The path 306-2 includes a new executable path 908-2 that begins at the end position of the previous path 908-1 and extends along the new path 306-2. As illustrated in graph 900-2, the executable path 908-2 deviates from the previous path 306-1 by navigating to set up the remainder of the path 306-2 to have a greater lateral offset with the pedestrian 906.

In graph 900-3 of FIG. 9-3 with T equal to 6 seconds, the vehicle 102 has executed the executable paths 908-1 and 908-2 (and another). The pedestrian 906 is now within the drivable aisle. Upon completion of the previous executable path, the parking system 120 replans the path 306 and generates an updated path 306-3. Because the pedestrian 906 is now in the drivable aisle, the path 306-3 moves further to the lateral right of the drivable aisle to pass the pedestrian 906. The path 306-3 includes a new executable path 908-3 that begins at the end position of the previous path and extends along the new path 306-3.

In graphs 900-4 and 900-5 of FIGS. 9-4 and 9-5, respectively, with T equal to 10 and 12 seconds, the vehicle 102 has executed the executable paths 908-1, 908-2, and 908-3 (and others). The pedestrian 906 is now positioned along the paths 306-4 and 306-5, respectively. As a result, the current paths 306-4 and 306-5 call for the vehicle 102 to slow down and allow the pedestrian 906 to cross the drivable aisle. Upon completion of the previous executable paths, the parking system 120 replanned the path 306 and generated the updated paths 306-4 and 306-5, with updated executable paths 908-4 and 908-5. The executable paths 908-4 and 908-5 begin at the end position of the previous executable path and extend along the new paths 306-4 and 306-5, respectively. As illustrated in graphs 900-4 and 900-5, the executable paths 908-4 and 908-5 are shorter than previous executable paths because they include a slow down to allow the pedestrian 906 to clear the paths 306-4 and 306-5.

In graph 900-6 of FIG. 9-6 with T equal to 16 seconds, the vehicle 102 has executed the executable paths 908-1 through 908-5 (and others). The pedestrian 906 has now crossed through the drivable aisle and the vehicle 102 previously proceeded past the Y position of the pedestrian 906. Upon completion of the previous executable path, the parking system 120 replanned the path 306 and generates an updated path 306-6. The path 306-6 includes a new executable path 908-6 that begins at the end position of the previous path, which the vehicle has executed. The parking system has one last path 306 to plan in order to reach the goal pose 902. Upon reaching the goal pose 902, the vehicle 102 may initiate a parking maneuver to park in a selected parking space. As another example, the vehicle 102 may exit the parking environment to begin travel on a roadway.

Example Method

Figure 10:
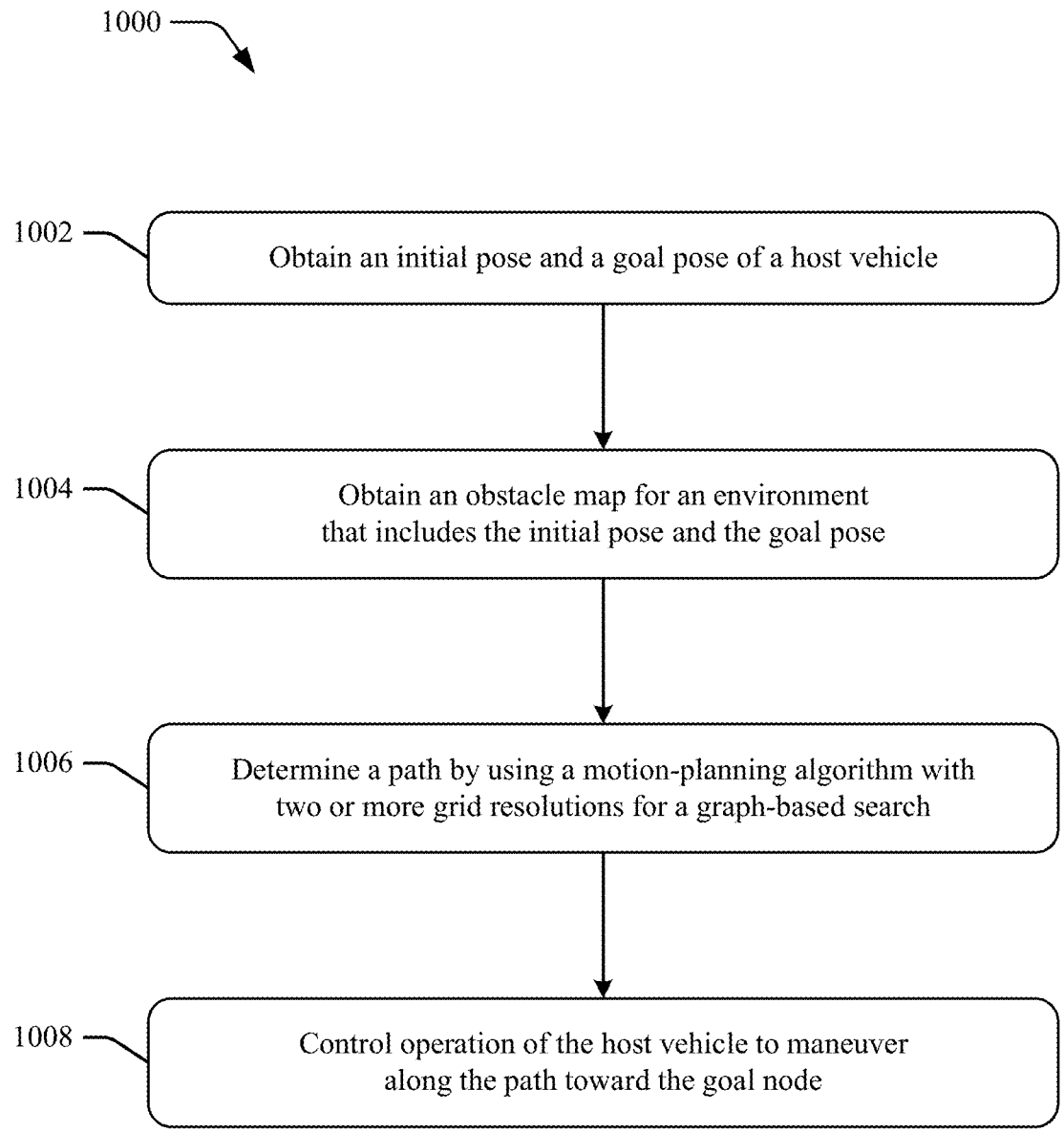
FIG. 10 illustrates an example method of a parking system that can use a variable grid resolution for graph-based planning.

FIG. 10 illustrates an example method 1000 of a parking system that uses a variable grid resolution for graph-based motion planning. Method 1000 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to environment 100 of FIG. 1, and entities detailed in FIGS. 1 through 9-6, reference to which is made for example only. The techniques are not limited to performance by one entity or multiple entities.

At step 1002, an initial pose and a goal pose of a host vehicle are obtained. For example, the motion planner 122 can obtain the initial pose of vehicle 102 from a vehicle state estimator. The initial pose can be determined using location data. The initial pose may represent a source node used in a motion-planning algorithm or graph-search based algorithm. The motion planner 122 can obtain the goal pose from the parking space selector 212 or the global planner 214. The goal pose may represent a goal node used in the motion-planning algorithm or graph-search based algorithm and may indicate a location near a selected parking space, a position along a roadway in the environment, or an exit from the environment. The goal pose can be determined using location data, map data, or other sensor data (e.g., data from a camera system, a radar system, a lidar system, or an ultrasonic sensor system).

At step 1004, an obstacle map for an environment that includes the initial pose and the goal pose is obtained. For example, the motion planner 122 can obtain the obstacle map from a perception system. The obstacle map can be a radar occupancy grid map or a radar-centric occupancy grid map for the environment 100. The obstacles in the obstacle map can be represented by bounding boxes, circles, occupancy grids or grid cells, free-space polygons, or any combination thereof. The motion planner 122 may also obtain a reference path.

At step 1006, a path (or trajectory) is determined using the obstacle map and two or more grid resolutions for a graph-based search by the motion-planning algorithm. The path or trajectory includes a series of 2D or 3D waypoints, respectively, that include 2D positional coordinates and time coordinates (if 3D waypoints provided) for the host vehicle to navigate from the initial pose toward the goal pose. For example, the motion planner 122 initially runs the motion-planning algorithm by searching using two or more grid resolutions in a 2D or 3D search space with space or space-time artificial potential fields, respectively, to obtain a series of 2D or 3D waypoints that include 2D positional coordinates (e.g., S and L coordinates) and time coordinates (if 3D waypoints are provided) (e.g., T coordinates) for navigating the vehicle 102 from an initial pose toward a goal pose.

The graph-based search may be performed in a two-dimensional search space that includes a longitudinal dimension (e.g., along an S axis) and a lateral dimension (e.g., along an L axis) that is perpendicular to the longitudinal dimension. The multiple grid resolutions include a first grid resolution and a second grid resolution along each of the longitudinal dimension and the lateral dimension, with the first grid resolution being smaller (or finer) than the second grid resolution. The motion-planning algorithm uses the first grid resolution for the area of the 2D search space nearest the vehicle 102. For example, the first grid resolution may include the environment that is a set distance or set travel time from the source node. In general, the second grid resolution is at least twice as large as the first grid resolution along each of the longitudinal dimension and the lateral dimension.

In other implementations, the graph-based search may be performed in a 3D search space that includes the longitudinal dimension, the lateral dimension, and a time dimension. The multiple grid resolutions include a first grid resolution and a second grid resolution along each of the longitudinal dimension, the lateral dimension, and the time dimension, with the first grid resolution being smaller than the second grid resolution. The parking algorithm uses the first grid resolution for the area of the 3D search space nearest the vehicle 102. For example, the first grid resolution may include the environment that is a set distance or set travel time from the source node. In general, the second grid resolution is at least twice as large as the first grid resolution along each of the longitudinal dimension, the lateral dimension, and time dimension.

The graph-based search may also use three or more grid resolutions, with a first grid resolution, a second grid resolution, and a third grid resolution along each of at least two of the longitudinal dimension, the lateral dimension, and the time dimension. The first grid resolution has a smaller resolution than the second grid resolution, which has a smaller resolution than the third grid resolution. The first grid resolution can be adjacent to the initial pose, while the third grid resolution is adjacent to the goal pose. The second grid resolution is located between the first grid resolution and the third grid resolution in the 2D or 3D search space.

The motion planner 122 can use a variety of motion-planning algorithms implementing graph-search based algorithms. For example, the motion-planning algorithm can be a variant of Hybrid A star (A*), A*, or Dijkstra algorithms for finding an optimal path from the initial pose to the goal pose using non-holonomic constraints for movement of the vehicle 102.

The motion-planning or graph-search-based algorithm uses space (for a 2D search space) or space-time (for a 3D search space) artificial potential fields to plan the path 306 that avoid collisions with stationary objects 112 and moving objects 114 in the environment 100. The artificial potential fields include repulsive potential fields and attractive potential fields. A respective repulsive potential field is a function (e.g., linear, inverse, quadratic, or exponential relationship) of a distance between the vehicle 102 and a respective stationary object 112 or a respective moving object 114. An attractive potential field may include a goal potential field that is a function (e.g., linear, inverse, quadratic, or exponential relationship) of a distance between the vehicle 102 and the goal pose. The attractive potential field may also include a reference path potential field that is a function (e.g., linear, inverse, quadratic, or exponential relationship) of a lateral distance or absolute distance between the vehicle 102 and a reference path, where the lateral distance is perpendicular to the reference path.

The motion-planning or graph-search-based algorithm may also account for or include a speed penalty to penalize velocities in the path 306 or trajectory that deviate from a reference speed or speed range, exceed a maximum speed threshold, or are less than a minimum speed threshold. Similarly, a steering penalty to penalize positions in the path 306 or trajectory that require a steering angle that exceeds a steering angle threshold may be used. Trajectory optimization may also be performed on the series of 2D or 3D waypoints to smooth the positions and speeds together and reduce curvature, acceleration, or jerkiness.

At step 1008, the operation of the host vehicle is controlled using an assisted-driving or an autonomous-driving system to maneuver along the path to or toward the goal pose. For example, the motion planner 122 can output the path 306 to the autonomous-driving system 220. The vehicle 102 can then be controlled using the autonomous-driving system 220 to navigate along the path 306 or trajectory.

The motion planner 122 may also perform horizon planning to identify or select the first waypoints of the path 306. The first waypoints include a subset of the 2D or 3D waypoints for the vehicle 102 to navigate from the initial pose toward the goal pose. This subset of waypoints may include positional coordinates and time coordinates that are included for a predetermined operation time (e.g., two seconds) or a predetermined distance (e.g., five meters) of the vehicle 102 along the path 306. In response to the autonomous-driving system 220 completing operation of the vehicle 102 along the first waypoints, the motion planner 122 can identify an intermediate pose from among the subset of positional coordinates that is at an end of the first waypoints. The motion-planning algorithm is then used with the two or more grid resolutions to determine another series of waypoints for an updated path 306 for the vehicle 102 to navigate from the intermediate pose toward the goal pose. In the updated graph-based search, at least the first grid resolution is shifted in space (and time) to determine a finer set of positional (and time) coordinates for the initial portion of the updated path 306. The autonomous-driving system 220 can then control the operation of the vehicle 102 to maneuver along the other (or updated) series of waypoints toward the goal pose from the intermediate pose toward the goal pose.

Additional Examples

In the following section, examples are provided.

Example 1. A method comprising: obtaining an initial pose and a goal pose of a host vehicle; obtaining an obstacle map for an environment that includes the initial pose and the goal pose; determining, using the obstacle map and two or more grid resolutions for a graph-based search by a motion-planning algorithm, a path, the path including a series of waypoints that includes two-dimensional (2D) positional coordinates for the host vehicle to navigate from the initial pose toward the goal pose; and controlling, using an assisted-driving or an autonomous-driving system, operation of the host vehicle to maneuver along the path toward the goal pose.

Example 2. The method of Example 1, wherein: the graph-based search is performed in a two-dimensional search space that includes a longitudinal dimension and a lateral dimension that is perpendicular to the longitudinal dimension; and the two or more grid resolutions include a first grid resolution and a second grid resolution along each of the longitudinal dimension and the lateral dimension, the first grid resolution being smaller than the second grid resolution, the first grid resolution being adjacent to the initial pose.

Example 3. The method of Example 2, wherein: the second grid resolution is at least twice as large as the first grid resolution along each of the longitudinal dimension and the lateral dimension.

Example 4. The method of any one of the previous Examples, wherein: the graph-based search is performed in a three-dimensional search space that include a longitudinal dimension, a lateral dimension that is perpendicular to the longitudinal dimension, and a time dimension; the two or more grid resolutions include a first grid resolution and a second grid resolution along each of the longitudinal dimension, the lateral dimension, and the time dimension, the first grid resolution being smaller than the second grid resolution, the first grid resolution being adjacent to the initial pose; and the waypoints further include time coordinates of the host vehicle.

Example 5. The method of Example 4, wherein: the second grid resolution is at least twice as large as the first grid resolution along each of the longitudinal dimension, the lateral dimension, and the time dimension.

Example 6. The method of any one of the previous Examples, wherein: the graph-based search for the path is performed using three grid resolutions; the three grid resolutions include a first grid resolution, a second grid resolution, and a third grid resolution along each of at least two of a longitudinal dimension, a lateral dimension that is perpendicular to the longitudinal dimension, and a time dimension, the first grid resolution being smaller than the second grid resolution that is smaller than the third grid resolution; and the first grid resolution being adjacent to the initial pose, the third grid resolution being adjacent to the goal pose, and the second grid resolution being in between the first grid resolution and the third grid resolution.

Example 7. The method of any one of the previous Examples, wherein the method further comprises: selecting first waypoints of the path, the first waypoints comprising a subset of the series of waypoints for the host vehicle to navigate from the initial pose toward the goal pose; in response to the assisted-driving or the autonomous-driving system completing operation of the host vehicle along the first waypoints, identifying an intermediate pose from among the first waypoints that is at a positional end of the first waypoints; determining, using the two or more grid resolutions for the graph-based search by the motion-planning algorithm, second waypoints of the path for the host vehicle to navigate from the intermediate pose toward the goal pose; and controlling, using the assisted-driving or the autonomous-driving system, operation of the host vehicle to maneuver along the second waypoints toward the goal pose.

Example 8. The method of Example 7, wherein the subset of the series of waypoints comprises positional coordinates for a predetermined operation time of the host vehicle along the path.

Example 9. The method of any one of the previous Examples, wherein: the environment includes one or more stationary objects or one or more moving objects; and the series of waypoints avoids collisions between the host vehicle and the one or more stationary objects or the one or more moving objects.

Example 10. The method of Example 9, wherein: the motion-planning algorithm comprises a graph-search based algorithm; the graph-search based algorithm uses space or space-time artificial potential fields for each of the one or more stationary objects and the one or more moving objects to avoid collisions with the one or more stationary objects or the one or more moving objects in the environment; and the artificial potential fields include repulsive potential fields and at least one attractive potential field, a respective repulsive potential field being a function of a distance between the host vehicle and a respective stationary object or a respective moving object, the at least one attractive potential field including a goal potential field that is a function of a distance between the host vehicle and the goal pose.

Example 11. The method of Example 10, wherein the at least one attractive potential field further includes a reference path potential field that is a function of a lateral distance between the host vehicle and the reference path, the lateral distance being perpendicular to the reference path.

Example 12. The method of Example 10 or 11, wherein the graph-search based algorithm comprises a variant of a Hybrid A star (A*), A*, Dijkstra algorithm for finding an optimal path from the initial pose to the goal pose.

Example 13. The method of any one of the previous Examples, wherein: the goal pose comprises a selected parking space, a position near the selected parking space, a position along a roadway in the environment, or an exit from the environment; the initial pose is generated by a vehicle state estimator using location data; the goal pose is generated by a parking space selector using the location data and other sensor data or map data; and the other sensor data includes data from at least one of a camera system, a radar system, a lidar system, or an ultrasonic sensor system.

Example 14. A system comprising one or more processors configured to perform the method of any one of Examples 1 through 13.

Example 15. Computer-readable storage media comprising computer-executable instructions that, when executed, cause a processor to perform the method of any one of Examples 1 through 13.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method comprising:
obtaining an initial pose and a goal pose of a host vehicle;
obtaining an obstacle map for an environment that includes the initial pose and the goal pose;
determining, using the obstacle map and two or more grid resolutions for a graph-based search by a motion-planning algorithm, a path, the path including a series of waypoints that includes two-dimensional (2D) positional coordinates for the host vehicle to navigate from the initial pose toward the goal pose; and
controlling, using an assisted-driving or an autonomous-driving system, operation of the host vehicle to maneuver along the path toward the goal pose,
wherein the graph-based search for the path is performed using three grid resolutions; and
wherein the three grid resolutions include a first grid resolution, a second grid resolution, and a third grid resolution along each of at least two of a longitudinal dimension, a lateral dimension that is perpendicular to the longitudinal dimension, and a time dimension, the first grid resolution being smaller than the second grid resolution that is smaller than the third grid resolution,
the first grid resolution being adjacent to the initial pose, the third grid resolution being adjacent to the goal pose, and the second grid resolution being in between the first grid resolution and the third grid resolution.

2. The method of claim 1, wherein:
the graph-based search is performed in a two-dimensional search space that includes a longitudinal dimension and a lateral dimension that is perpendicular to the longitudinal dimension; and
the two or more grid resolutions include a first grid resolution and a second grid resolution along each of the longitudinal dimension and the lateral dimension, the first grid resolution being smaller than the second grid resolution, the first grid resolution being adjacent to the initial pose.

3. The method of claim 2, wherein:
the second grid resolution is at least twice as large as the first grid resolution along each of the longitudinal dimension and the lateral dimension.

4. The method of claim 1, wherein:
the graph-based search is performed in a three-dimensional search space that include a longitudinal dimension, a lateral dimension that is perpendicular to the longitudinal dimension, and a time dimension;
the two or more grid resolutions include a first grid resolution and a second grid resolution along each of the longitudinal dimension, the lateral dimension, and the time dimension, the first grid resolution being smaller than the second grid resolution, the first grid resolution being adjacent to the initial pose; and
the waypoints further include time coordinates of the host vehicle.

5. The method of claim 4, wherein:
the second grid resolution is at least twice as large as the first grid resolution along each of the longitudinal dimension, the lateral dimension, and the time dimension.

6. The method of claim 1, wherein the method further comprises:

selecting first waypoints of the path, the first waypoints comprising a subset of the series of waypoints for the host vehicle to navigate from the initial pose toward the goal pose;

in response to the assisted-driving or the autonomous-driving system completing operation of the host vehicle along the first waypoints, identifying an intermediate pose from among the first waypoints that is at a positional end of the first waypoints;

determining, using the two or more grid resolutions for the graph-based search by the motion-planning algorithm, second waypoints of the path for the host vehicle to navigate from the intermediate pose toward the goal pose; and controlling, using the assisted-driving or the autonomous-driving system, operation of the host vehicle to maneuver along the second waypoints toward the goal pose.

7. The method of claim 6, wherein the subset of the series of waypoints comprises positional coordinates for a predetermined operation time of the host vehicle along the path.

8. The method of claim 1, wherein:
the environment includes one or more stationary objects or one or more moving objects; and
the series of waypoints avoids collisions between the host vehicle and the one or more stationary objects or the one or more moving objects.

9. The method of claim 8, wherein:
the motion-planning algorithm comprises a graph-search based algorithm;
the graph-search based algorithm uses space or space-time artificial potential fields for each of the one or more stationary objects and the one or more moving objects to avoid collisions with the one or more stationary objects or the one or more moving objects in the environment; and
the artificial potential fields include repulsive potential fields and at least one attractive potential field, a respective repulsive potential field being a function of a distance between the host vehicle and a respective stationary object or a respective moving object, the at least one attractive potential field including a goal potential field that is a function of a distance between the host vehicle and the goal pose.

10. The method of claim 9, wherein the at least one attractive potential field further includes a reference path potential field that is a function of a lateral distance between the host vehicle and a reference path, the lateral distance being perpendicular to the reference path.

11. The method of claim 9, wherein the graph-search based algorithm comprises a variant of a Hybrid A star (A*), A*, Dijkstra algorithm for finding an optimal path from the initial pose to the goal pose.

12. The method of claim 1, wherein:
the goal pose comprises a selected parking space, a position near the selected parking space, a position along a roadway in the environment, or an exit from the environment;
the initial pose is generated by a vehicle state estimator using location data;
the goal pose is generated by a parking space selector using the location data and other sensor data or map data; and
the other sensor data includes data from at least one of a camera system, a radar system, a lidar system, or an ultrasonic sensor system.

13. A system comprising one or more processors configured to:

obtain an initial pose and a goal pose of a host vehicle;
obtain an obstacle map for an environment that includes the initial pose and the goal pose;
determine, using the obstacle map and two or more grid resolutions for a graph-based search by a motion-planning algorithm, a path, the path including a series of waypoints that includes two-dimensional (2D) positional coordinates for the host vehicle to navigate from the initial pose toward the goal pose; and
control, using an assisted-driving or an autonomous-driving system, operation of the host vehicle to maneuver along the path toward the goal pose,
wherein the graph-based search for the path is performed using three grid resolutions; and
wherein the three grid resolutions include a first grid resolution, a second grid resolution, and a third grid resolution along each of at least two of a longitudinal dimension, a lateral dimension that is perpendicular to the longitudinal dimension, and a time dimension, the first grid resolution being smaller than the second grid resolution that is smaller than the third grid resolution, the first grid resolution being adjacent to the initial pose, the third grid resolution being adjacent to the goal pose, and the second grid resolution being in between the first grid resolution and the third grid resolution.

14. The system of claim 13, wherein:
the graph-based search is performed in a two-dimensional search space that includes a longitudinal dimension and a lateral dimension that is perpendicular to the longitudinal dimension; and
the two or more grid resolutions include a first grid resolution and a second grid resolution along each of the longitudinal dimension and the lateral dimension, the first grid resolution being smaller than the second grid resolution, the first grid resolution being adjacent to the initial pose.

15. The system of claim 13, wherein:
the graph-based search is performed in a three-dimensional search space that include a longitudinal dimension, a lateral dimension that is perpendicular to the longitudinal dimension, and a time dimension;
the two or more grid resolutions include a first grid resolution and a second grid resolution along each of the longitudinal dimension, the lateral dimension, and the time dimension, the first grid resolution being smaller than the second grid resolution, the first grid resolution being adjacent to the initial pose; and
the waypoints further include time coordinates of the host vehicle.

16. The system of claim 13, wherein the one or more processors are further configured to:
select first waypoints of the path, the first waypoints comprising a subset of the series of waypoints for the host vehicle to navigate from the initial pose toward the goal pose;
in response to the assisted-driving or the autonomous-driving system completing operation of the host vehicle along the first waypoints, identify an intermediate pose from among the first waypoints that is at a positional end of the first waypoints;
determine, using the two or more grid resolutions for the graph-based search by the motion-planning algorithm, second waypoints of the path for the host vehicle to navigate from the intermediate pose toward the goal pose; and control, using the assisted-driving or the autonomous-driving system, operation of the host vehicle to maneuver along the second waypoints toward the goal pose.

17. The system of claim 16, wherein the subset of the series of waypoints comprises positional coordinates for a predetermined operation time of the host vehicle along the path.

18. Computer-readable storage media comprising computer-executable instructions that, when executed, cause a processor to:
obtain an initial pose and a goal pose of a host vehicle;
obtain an obstacle map for an environment that includes the initial pose and the goal pose;
determine, using the obstacle map and two or more grid resolutions for a graph-based search by a motion-planning algorithm, a path, the path including a series of waypoints that includes two-dimensional (2D) positional coordinates for the host vehicle to navigate from the initial pose toward the goal pose; and
control, using an assisted-driving or an autonomous-driving system, operation of the host vehicle to maneuver along the path toward the goal pose, wherein the graph-based search for the path is performed using three grid resolutions; and wherein the three grid resolutions include a first grid resolution, a second grid resolution, and a third grid resolution along each of at least two of a longitudinal dimension, a lateral dimension that is perpendicular to the longitudinal dimension, and a time dimension, the first grid resolution being smaller than the second grid resolution that is smaller than the third grid resolution, the first grid resolution being adjacent to the initial pose, the third grid resolution being adjacent to the goal pose, and the second grid resolution being in between the first grid resolution and the third grid resolution.

* * * * *